US006964018B1

(12) United States Patent
Masui

(10) Patent No.: US 6,964,018 B1
(45) Date of Patent: Nov. 8, 2005

(54) DOCUMENT EDITING PROCESSING METHOD AND APPARATUS AND PROGRAM FURNISHING MEDIUM

(75) Inventor: Toshiyuki Masui, Tokyo (JP)

(73) Assignee: Sony Corporation, Tokyo (JP)

( * ) Notice: Subject to any disclaimer, the term of this patent is extended or adjusted under 35 U.S.C. 154(b) by 1032 days.

(21) Appl. No.: 09/697,365

(22) Filed: Oct. 26, 2000

(30) Foreign Application Priority Data

Oct. 29, 1999 (JP) ............................... P11-308047

(51) Int. Cl.⁷ ............................................ G06F 15/00
(52) U.S. Cl. ...................... 715/530; 715/522; 715/532; 715/501.1; 704/1; 704/7; 704/10; 382/181
(58) Field of Search ............................. 715/501.1, 522, 715/530, 532; 707/103; 704/1, 7, 10; 382/181

(56) References Cited

U.S. PATENT DOCUMENTS

| | | | |
|---|---|---|---|
| 5,724,457 A | | 3/1998 | Fukushima |
| 5,734,749 A | | 3/1998 | Yamada et al. |
| 5,959,629 A | | 9/1999 | Masui |
| 6,002,390 A | | 12/1999 | Masui |
| 6,044,365 A | * | 3/2000 | Cannon et al. ................ 707/2 |
| 6,047,291 A | * | 4/2000 | Anderson et al. ........ 707/103 R |
| 6,151,598 A | * | 11/2000 | Shaw et al. ..................... 707/3 |
| 6,219,021 B1 | * | 4/2001 | Izumi .......................... 345/102 |
| 6,789,263 B1 | * | 9/2004 | Shimada et al. ............ 725/119 |
| 6,845,388 B1 | * | 1/2005 | Philyaw ...................... 709/204 |

FOREIGN PATENT DOCUMENTS

JP     10-154144     6/1998

OTHER PUBLICATIONS

Masui, "An Efficient Text Input Method for Pen-Based Computers".
Shimajiri et al., "Goal-Directed Query Processing in Disjunctive Logic Databases" pp. 23-31.
Baeza-Yates, Ricardo and Gonnet, Gaston H., "Communications of the ACM," CIC Northwestern University, Oct. 1992, http://web2.infotrac.galegroup.com.turing.library.northwestern.edu/itw/infomark/192/114/54876331w2/purl.html, Sep. 24, 2003, pp. 1-10.
Wu, Sun and Manber, Udi, "AGREP—A Fast Approximate Pattern-Matching Tool," Department of Computer Science, University of Arizona, pp. 1-10.

* cited by examiner

Primary Examiner—Sanjiv Shah
Assistant Examiner—Rachna Singh
(74) Attorney, Agent, or Firm—Bell, Boyd & Lloyd LLC

(57) ABSTRACT

A document editing processing apparatus which enables formulation of a hybrid multimedia document containing e.g., an image readily and speedily. Each time a character is input, dictionary retrieval is performed with e.g., an undefined character as a retrieving condition, at the same time as a filename of a multimedia information file is retrieved. The results obtained on dictionary retrieval and the results obtained on file searching are demonstrated on a menu as conversion candidates. Alternatively, a multimedia dictionary is retrieved, using a multimedia dictionary in which the multimedia information has been registered in association with the reading, with the retrieved results being conversion candidates. Still alternatively, dictionary retrieval is executed, with e.g., an undefined character as a retrieving condition, using a word dictionary having the reading associated with multimedia information identifiers. This enables formulation of a hybrid multimedia document containing e.g., an image readily and speedily.

37 Claims, 25 Drawing Sheets

DOCUMENT EDITING PROCESSING METHOD AND APPARATUS AND PROGRAM FURNISHING MEDIUM

BACKGROUND OF THE INVENTION

1. Field of the Invention

This invention relates to a document editing processing method and apparatus and, more specifically, to a document editing processing configuration applicable in document editing employing a word processor, a DTP, a commuter and a portable document inputting apparatus. More particularly, it relates to a document editing processing method and apparatus and a program furnishing medium enabling high-speed conversion based on a user-input reading while enabling not only kana-kanji conversion processing (conversion from Japanese syllabic characters to Chinese characters), that is conversion from input reading data to kanji, but also high-speed conversion from the input reading data to the multimedia information pieces, such as picture information.

2. Description of Related Art

In preparing various documents, such as information letters, presentation materials or mails, by a document processing device, such as a word processor, a portable document inputting device or a personal computer, a user inputs optional characters, such as hiragana (cursive kana characters), kana characters and alphabetical letters, from a variety of inputting means, such as keyboard, pen inputting means or manuscript character inputting means, and performs kanji conversion processing to an input character string, if need be, to prepare a document. Recently, such a system has been developed in which a heart-shaped figure, a variety of figures, such as a human face, or picture data, are demonstrated in a hybridized fashion in these documents to create a document exhibiting higher visual effects.

The operation of inserting figure data into a document is executed by e.g., the following sequence: The user desirous to insert a figure or a picture into an input document first invokes a picture data file having variable picture data registered therein to open the picture data file to display a list of registered picture data file. The user then selects an appropriate picture to introduce the selected picture at a pre-set point into a document.

However, since a wide variety of picture data are stored in the picture data file, it is not that easy to select desired pictures from the voluminous data. So, there is such a configuration in which the picture data are classed into various categories, such as human being, animals or vehicles, and to display only picture data deliberately selected from these categories to assure facilitated picture data selection by a user.

There is also such a configuration in which a pre-set keyword is associated with picture data registered in a picture data file and in which, after opening the picture data file, the user is able to input a keyword, whereby only picture data associated with the input keyword is demonstrated as a list to assure facilitated selection of the picture data.

However, in any of the above-described methods, it is necessary to carry out plural processing steps, such as invoking picture data files, listed display of picture data and selection, thus imposing significant load on the user while lowering the document preparing processing speed.

The present Assignee has proposed in our previous patent applications, namely the Japanese Laying-Open Patent H-10-150433 and Japanese Laying-Open Patent H-10-154144 a document inputting executing method and apparatus which assures efficient and speedy document inputting operations.

In the document inputting apparatus, disclosed in these prior-art present applications, plural conversion candidates are retrieved and extracted, based on the kana characters or Roman letters, fed via inputting means, and the extracted conversion candidates are demonstrated on a display in order for a user to select a desired word from the displayed conversion candidates.

The document inputting methods, disclosed in these prior-art present applications, document can be prepared by (1) character inputting by a user, (2) displaying conversion candidates based on an input character string from a dictionary having stored therein plural words and plural exemplary sentences and (3) selecting desired words from the displayed conversion candidates. Since the display processing of conversion candidates based on the input character string enables conversion candidate words, such as 感謝(gratitude, uttered as "kansha")", "漢字(Chinese characters, uttered as "kanji")" or "感心(admiration, uttered as "kanshin")", to be displayed by a user desirous to input 感謝 (gratitude, uttered as "kansha")" merely inputting the first character of its reading "か(uttered as "ka")", it is unnecessary to perform conversion processing after the user inputs "かんしゃ(uttered as "kansha")". Since this enables a conversion candidate to be displayed and selected merely by inputting not less than one reading as the necessary minimum reading, it becomes possible to input a document efficiently and speedily.

SUMMARY OF THE INVENTION

It is therefore an object of the present invention to provide a document editing processing method and apparatus which represents further development of the above-described document inputting executing device and which, based on reading inputting processing from a user, displays not only plural words and character strings as conversion candidates, but also the multimedia information, such as the figure, picture information, speech information and moving picture information, as conversion candidates for the input character string, to permit a user to select desired words, character strings, figures and pictures from the multimedia information conversion candidates including the displayed figures and picture information pieces.

In its first aspect, the present invention provides a document editing processing apparatus for preparing a document by the inputting of a character string, in which the apparatus includes displaying means for displaying characters and images, inputting means for inputting a character string in a document forming area in the display means, storage means having stored therein the multimedia information at least including a figure, image information, speech information and the moving picture information, a word dictionary in which reading data is associated with a displayed character and further the reading data is associated with a multimedia information identifier representing the multimedia information to be displayed, a multimedia information registration table in which a keyword associated with reading data in the word dictionary is associated with the multimedia information identifier, and retrieving means for executing forward coincidence retrieval on reading data of the word dictionary, with an undefined character as a retrieving condition, from one new character inputting processing by the inputting means to another. If the multimedia information identifier is included in data extracted from the word dictionary as a result of retrieval by the retrieving means, the multimedia information as determined based on the multimedia information identifier is extracted from the storage means for demonstration on the display means as selectable conversion candidate data.

Preferably, the document editing processing apparatus also includes an exemplary sentence dictionary in which a defined character is associated with reading data of a character most likely to be input next to the defined character and a display character associated with the reading data and in which reading data is associated with a multimedia information identifier indicating the multimedia information to be displayed. The retrieving means executes retrieval of defined registered character of the exemplary sentence dictionary or forward coincidence retrieval of the defined registered character with the registered reading data, using the defined character or the combination of the defined character with an undefined character as a retrieving condition. If there is included a multimedia information identifier in data extracted from the exemplary sentence dictionary as a result of retrieval by the retrieving means, the multimedia information indicated by the multimedia information identifier is extracted from the storage means for demonstration as selectable conversion candidate data on the display means.

Preferably, the multimedia information registration table includes multimedia information access data, in association with each multimedia information identifier, for accessing the multimedia information stored in the storage means. The multimedia information access data includes data for specifying storage means having the multimedia information stored therein.

Preferably, the storage means having the multimedia information stored therein is storage means accessible over a network.

Preferably, the multimedia information registration table is configured for being associated with one or more keywords in association with respective multimedia information identifiers.

Preferably, the multimedia information registration table is configured for making various modifications, such as addition, deletion or correction of registered data. Also preferably, the various modifications, such as addition, deletion or correction of registered multimedia information identifiers or keywords in the multimedia information registration table are reflected in corresponding registered data of the word dictionary so that similar modifications are made in the word dictionary.

Preferably, the multimedia information registration table is configured for making various modifications, such as addition, deletion or correction of registered data. Also preferably, the various modifications, such as addition, deletion or correction of registered multimedia information identifiers or keywords in the multimedia information registration table, are reflected in corresponding registered data of the exemplary sentence dictionary so that similar modifications are made in the exemplary sentence dictionary.

Preferably, the conversion candidate data are represented in a document forming area of the display means or in the vicinity thereof as a set of plural conversion candidate data not exceeding N which is a pre-set display number. Also preferably, conversion candidate words or conversion candidate multimedia information selected from the displayed conversion candidate data are displayed as defined data in a document input position in the document forming area.

Preferably, the word dictionary is configured for dynamically changing the registration sequence of registered data, the word dictionary being also configured so that, if data is selected as document component data in document forming processing, the relevant data in the word dictionary is moved to the leading end. The retrieving means is also configured for sequentially retrieving the word dictionary beginning from its leading end.

Preferably, the exemplary sentence dictionary is configured for dynamically changing the registration sequence of registered data, the word dictionary being also configured so that, if data is selected as document component data in document forming processing, the relevant data in the exemplary sentence dictionary is moved to the leading end. The retrieving means is configured for sequentially retrieving the exemplary sentence dictionary beginning from its leading end.

In its second aspect, the present invention provides a document editing processing apparatus for preparing a document by the inputting of a character string, including displaying means for displaying characters and images, inputting means for inputting a character string in a document forming area in the display means, storage means having stored therein the multimedia information at least including one of a figure, the image information, speech information and the moving picture information so that the multimedia information can be extracted depending on a filename, a word dictionary in which reading data is associated with display characters, dictionary retrieving means for executing forward coincidence retrieval on reading data of the document dictionary, using an undefined character as a retrieving condition, from one new character inputting processing by the inputting means to another, and file retrieving means for executing forward coincidence retrieval on filenames of the storage means, using an undefined character as a retrieving condition, from one new character inputting processing by the inputting means to another. The data extracted from the document dictionary as a result of retrieval by the dictionary retrieving means and the multimedia information extracted from the storage means as a result of retrieval by the file retrieving means are displayed on the displaying means as selectable conversion candidate data.

Preferably, the retrieving processing of a document dictionary by the dictionary retrieving means and retrieving processing of a file of the storage means by the file retrieving means are executed in parallel.

Preferably, the document dictionary is constituted by plural different document dictionaries. Also preferably, there are provided plural dictionary retrieving means for executing retrieval of the plural document dictionaries. The retrieving processing of document dictionaries by the plural dictionary retrieving means is executed in parallel.

Preferably, the storage means having the multimedia information stored therein is storage means accessible over a network.

Preferably, the conversion candidate data are represented by a set of a plurality of, specifically, not larger than N conversion candidate data, in a document forming areas of the display means or in the vicinity thereof, where N is a pre-set number of displayed data. Also preferably, the conversion candidate words or the conversion candidate multimedia information as selected from the displayed conversion candidate data are demonstrated as defined data at document input positions in the document forming area.

In its third aspect, the present invention provides a document editing processing apparatus for preparing a document by the inputting of a character string including displaying means for displaying characters and images, inputting means for inputting a character string in a document forming area in the display means, a multimedia dictionary in which reading data is associated with displayed characters and in which the reading data is associated with the multimedia information containing at least one of the reading data, figure, image information, speech information and the moving picture information, and retrieval means for executing forward coincidence retrieval on the reading data of the multimedia dictionary, with the undefined character as a retrieving condition, from one new character inputting processing from the inputting at means to another. At least one of the displayed characters and the multimedia information extracted from the multimedia dictionary as a result of retrieval by the retrieval means is displayed as selectable conversion candidate data in the display means.

Preferably, the multimedia dictionary having the multimedia information as recording data is stored in storage means accessible over a network.

Preferably, the conversion candidate data are represented by a set of a plurality of, specifically, not larger than N conversion candidate data, in a document forming areas of the display means or in the vicinity thereof, where N is a pre-set number of displayed data. Also preferably, the conversion candidate words or the conversion candidate multimedia information as selected from the displayed conversion candidate data are demonstrated as defined data at document input positions in the document forming area.

In its fourth aspect, the present invention provides a document editing processing apparatus for preparing a document by the inputting of a character string. The apparatus includes displaying means for displaying characters and images, inputting means for inputting a character string in a document forming area in the display means, a multimedia dictionary in which reading data is associated with displayed characters and in which the reading data is associated with the multimedia information containing at least one of the reading data, figure, image information, speech information and moving picture information, or address data having stored therein the multimedia information, storage means having stored therein the multimedia information containing at least one of the reading data, figure, image information, speech information and moving picture information so that the multimedia information can be extracted depending on addresses, and retrieval means for executing forward coincidence retrieval on the reading data of the multimedia dictionary, with the undefined character as a retrieving condition, from one new character inputting processing from the inputting at means to another. At least one of the displayed characters or the multimedia information extracted from the multimedia dictionary as a result of retrieval by the retrieval means and data extracted from the storage means based on the address data extracted from the multimedia dictionary is displayed as selectable conversion candidate data in the display means.

Preferably, the storage means having the multimedia information is accessible over a network.

Preferably, the conversion candidate data are represented by a set of a plurality of, specifically, not larger than N conversion candidate data, in a document forming area of the display means or in the vicinity thereof, where N is a pre-set number of displayed data. Also preferably, the conversion candidate words or the conversion candidate multimedia information as selected from the displayed conversion candidate data are demonstrated as defined data at document input positions in the document forming area.

In its fifth aspect, the present invention provides a document editing processing method in a document editing processing apparatus for preparing a document by the inputting of a character string, including displaying means for displaying characters and images, inputting means for inputting a character string in a document forming area in the display means, and storage means having stored therein the multimedia information including at least one of a figure, image information, speech information and the moving picture information. The method includes a retrieving condition setting step of setting an undefined character as a retrieving condition from one new character inputting processing from inputting means to another, a retrieving step of executing forward coincidence retrieval on reading data of a word dictionary, based on the retrieving condition as set at the retrieving condition setting step, the word dictionary being such a one in which the reading data is associated with a multimedia information identifier indicating the multimedia information to be displayed, a multimedia information extracting step of extracting from the storage means the multimedia information determined based on the multimedia information identifier when the multimedia information identifier is included in data extracted from the word dictionary in the retrieval step, and a display step for displaying the multimedia information extracted at the multimedia information extracting step as selectable conversion candidate data on the display means.

Preferably, the document editing processing method includes a second retrieving condition setting step of setting a defined character or a combination of a defined character and an undefined character as a retrieving condition from one input character defining processing or one new character inputting operation from inputting means to another, a second retrieval step of executing retrieval on registered defined characters of an exemplary sentence dictionary having defined characters associated with a multimedia information identifier indicating the multimedia information for display most likely to be input next to the defined character, or forward coincidence retrieval of the registered defined characters and registered reading data, based on the retrieving condition as set at the second retrieving condition setting step. The multimedia information extracting step extracts from the storage means the multimedia information as determined based on the multimedia information identifier if the multimedia information identifier is included in data extracted from the exemplary sentence dictionary in the second retrieval step.

Preferably, the multimedia information registration table has multimedia information access data for accessing the multimedia information stored in the storage means in association with each multimedia information identifier, and the multimedia information extracting step extracts the corresponding multimedia information from the storage means based on the multimedia information access data associated with the multimedia information identifier.

Preferably, the display step is a step of displaying a set of a plurality of, specifically, not larger than N conversion candidate data, in a document forming area of the display means or in the vicinity thereof, N being a pre-set number of displayed data. If a conversion candidate word or a conversion candidate multimedia information piece is selected from the conversion candidate data displayed at the display step, the conversion candidate word or multimedia information pieces so selected is displayed as defined data at a document inputting position in the document forming area.

Preferably, the document editing processing method further includes a word dictionary registration sequence changing step of shifting relevant data in the word dictionary to a leading end if the data is selected as sentence constituent data in document preparation processing.

Preferably, the document editing processing method further includes an exemplary sentence dictionary registration sequence changing step of shifting relevant data in the exemplary sentence dictionary to a leading end if the data is selected as sentence constituent data in document preparation processing.

In its sixth aspect, the present invention provides a document editing processing method in a document editing processing apparatus for preparing a document by the inputting of a character string including displaying means for displaying characters and images, inputting means for inputting a character string in a document forming area in the display means, a word dictionary having reading data associated with characters to be displayed, and storage means having stored therein the multimedia information including at least one of a figure, image information, speech information and the moving picture information so that the multimedia information can be extracted responsive to a filename. The method includes a retrieving condition setting step of setting an undefined character as a retrieving condition from one new character inputting processing from inputting means to another, a dictionary retrieving step of executing forward coincidence retrieval on reading data of the document dictionary, with the undefined character as a retrieving condition, from one new character inputting processing from the inputting means to another, a file retrieving step of executing forward coincidence retrieval on filenames of the storage step, with the undefined character as the retrieving condition, from one new character inputting processing from the inputting means to another, and a displaying step of demonstrating the data extracted from the document dictionary as a result of the dictionary retrieving step and the multimedia information extracted from the storage step as a result of the file retrieving step.

Preferably, the dictionary retrieving step and the file retrieving step are performed as parallel processing.

Preferably, the document dictionary is made up of a plurality of different document dictionaries, and the dictionary retrieving step is such a step in which retrieval of a plurality of document dictionaries is executed in parallel by a plurality of dictionary retrieving means.

Preferably, the display step is a step of displaying a set of a plurality of, specifically, not larger than N conversion candidate data, in a document forming area of the display means or in the vicinity thereof, N being a pre-set number of displayed data. The method further includes a step of displaying a conversion candidate word or a conversion candidate multimedia information piece as defined data at a document inputting position in the document forming area if the conversion candidate word or multimedia information piece is selected from the conversion candidate data displayed at the display step.

In its seventh aspect, the present invention provides a document editing processing method in a document editing processing apparatus including displaying means for displaying characters and images, inputting means for inputting a character string in a document forming area in the display means, and a multimedia dictionary having reading data associated with a displayed character and having the reading data associated with multimedia information containing at least one of a figure, image information, speech information and the displayed character. The method includes a retrieving condition setting step of setting an undefined character as a retrieving condition from one new character inputting processing from inputting means to another, a dictionary retrieving step of executing forward coincidence retrieval on reading data of the multimedia dictionary, with the undefined character as a retrieving condition, from one new character inputting processing from the inputting means to another, and a displaying step of demonstrating the data extracted from the multimedia dictionary as a result of the dictionary retrieving step as selectable conversion candidate data on the display means.

Preferably, the display step is a step of displaying a set of a plurality of, specifically, not larger than N conversion candidate data, in a document forming area of the display means or in the vicinity thereof, where N is a pre-set number of displayed data. The method further includes a step of displaying a conversion candidate word or a conversion candidate multimedia information piece as defined data at a document inputting position in the document forming area if the conversion candidate word or multimedia information piece is selected from the conversion candidate data displayed at the display step.

In its eighth aspect, the present invention provides a document editing processing method in a document editing processing apparatus including displaying means for displaying characters and images, inputting means for inputting a character string in a document forming area in the display means, a multimedia dictionary having reading data associated with a displayed character and having the reading data associated with multimedia information containing at least one of a figure, image information, speech information and the displayed character, and storage means having stored therein the multimedia information containing at least one of a figure, image information, speech information and the displayed character so that the multimedia information can be extracted responsive to an address. The method includes a retrieving condition setting step of setting an undefined character as a retrieving condition from one new character inputting processing from inputting means to another, a dictionary retrieving step of executing forward coincidence retrieval on reading data of the multimedia dictionary, with the undefined character as a retrieving condition, from one new character inputting processing from the inputting means to another and a displaying step of demonstrating the display character or the multimedia information extracted from the multimedia dictionary as a result of the dictionary retrieving step or data extracted from the storage means based on address data extracted from the multimedia dictionary as selectable conversion candidate data on the display means.

Preferably, the display step is a step of displaying a set of a plurality of, specifically, not larger than N conversion candidate data, in a document forming area of the display means or in the vicinity thereof, N being a pre-set number of displayed data. The method further includes a step of displaying a conversion candidate word or a conversion candidate multimedia information piece as defined data at a document inputting position in the document forming area if the conversion candidate word or multimedia information piece is selected from the conversion candidate data displayed at the display step.

In its ninth aspect, the present invention provides a program furnishing medium for tangibly furnishing a computer program for executing document editing processing on a computer system, the computer program including a retrieving condition setting step of setting an undefined character as a retrieving condition from one new character inputting processing from inputting means to another, a retrieving step of executing forward coincidence retrieval on reading data of a word dictionary, based on the retrieving condition as set at the retrieving condition setting step, the word dictionary being such a one in which the reading data is associated with a multimedia information identifier indicating the multimedia information to be displayed, a multimedia information extracting step of extracting from the storage means the multimedia information determined based on the multimedia information identifier when the multimedia information identifier is included in data extracted from the word dictionary in the retrieval step and a display step for displaying the multimedia information extracted at the multimedia information extracting step as selectable conversion candidate data on the display means.

In its tenth aspect, the present invention provides a program furnishing medium for tangibly furnishing a computer program for executing document editing processing on a computer system, the computer program including a retrieving condition setting step of setting an undefined character as a retrieving condition from one new character inputting processing from inputting means to another, a dictionary retrieving step of executing forward coincidence retrieval on reading data of the document dictionary, with the undefined character as a retrieving condition, from one new character inputting processing from the inputting means to another, a file retrieving step of executing forward coincidence retrieval on filenames of the storage means, with the undefined character as the retrieving condition, from one new character inputting processing from the inputting means to another and a displaying step of demonstrating the data extracted from the document dictionary as a result of the dictionary retrieving step and the multimedia information extracted from the storage means as a result of the file retrieving step.

The program furnishing medium according to the ninth and tenth aspects of the present invention furnishes a computer program, in a computer-readable form, to a general-purpose computer system capable of executing a variety of program codes. The medium may be a CD, an FD, an MO or a transmission medium, such as a network, in a non-limiting fashion.

The program furnishing medium gives a definition of the structural or functional coperative relation between the computer program and the furnishing medium for implementing the function of the pre-set computer program on a computer system. Stated differently, the computer program is installed on a computer system through the furnishing medium to realize the cooperation on the computer system to achieve the operation and effect similar to those of the other aspects of the present invention.

In the document editing processing method and apparatus of the present invention, as described above, in which a variety of multimedia information pieces, such as the still picture images, moving picture information, speech information and other programs, are associated with keywords to prepare a registration table to render it possible to prepare a document based on the characters, words, prediction and estimation of characters, words or phrases, it becomes possible to prepare a multimedia document merely by repeating the processing consisting in presenting a set of a variety of multimedia information pieces, meticulously selected based on partial reading designation and on prediction from the character string directly before the input position, such as candidate words, candidate images, moving picture information, speech information or other programs, and in selecting the words, images, moving picture information or other programs. It is therefore possible to prepare a hybrid multimedia documents, including images, far more speedily and readily than is possible with the conventional character inputting technique which is based on kana-kanji conversion processing derived from conversion after inputting the entire readings.

Moreover, in the document editing processing method and apparatus of the present invention, a variety of multimedia information pieces, such as still picture information, moving picture information, speech information or other programs, directly by file search based on the filename, so that, by usng a document dictionary and a file search in combination, a hybrid document including images can be prepared without generating a special multimedia accommodating dictionary. Also, since the registration of the new multimedia information resides merely in preparing a new file with the reading as a filename, complex procedure, such as registration, can be dispensed with.

Moreover, in the document editing processing method and apparatus of the present invention, in which a variety of the multimedia information pieces, such as still picture information, moving picture information, speech information or other programs, are registered along with reading data" in a multimedia dictionary, along with the text data, this reading data" being then retrieved based on the input characters, the hybrid image-text multimedia document can be prepared readily and speedily.

BRIEF DESCRIPTION OF THE DRAWINGS

FIG. 11 shows a typical word dictionary used in a document processing apparatus according to the present invention.

FIG. 12 shows a typical exemplary sentence dictionary used in a document processing apparatus according to the present invention.

FIG. 20 shows an example of a word dictionary; used in the second embodiment of the document editing processing apparatus according to the present invention.

FIG. 21 shows an example of an exemplary sentence dictionary used in the document editing processing apparatus according to the present invention.

DESCRIPTION OF THE PREFERRED EMBODIMENTS

Figure 1:
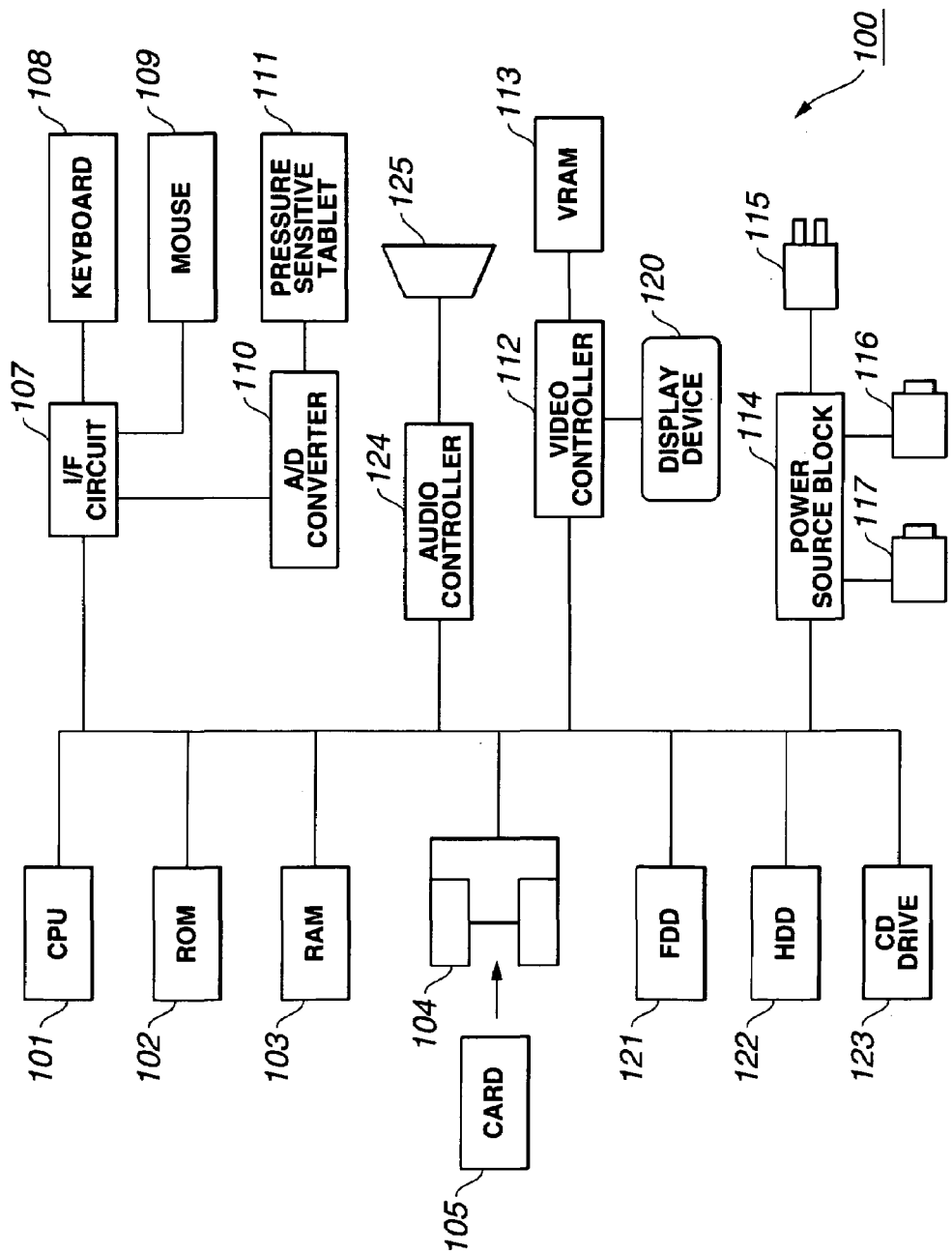
FIG. 1 is a block diagram showing the structure of a personal computer embodying a document editing processing apparatus of the present invention.

Referring to the drawings, preferred embodiments of according to the present invention will be explained in detail.

Embodiment 1

FIG. 1 shows the structure of a preferred embodiment of a document editing processing apparatus 100 according to the present invention. The document editing processing apparatus 100 is a realization of the document editing processing apparatus of the present invention on a personal computer, and shows its hardware structure. Meanwhile, the document editing processing apparatus of the present invention can also be realized on a portable equipment carrying e.g., a small-sized liquid crystal display, whilst part of the structure of the document editing processing apparatus 100 shown in FIG. 1 may be realized by ASIC.

The document editing processing apparatus 100, shown in FIG. 1, according to the present invention, has a display device 112, and is configured for displaying letters, figures or pictures corresponding to data, such as letter string, input from a keyboard 108 or a mouse 109 through an interfacing circuit 107, or to data, such as letter string, input from a pressure-sensitive tablet 111 or an A/D converter 110, on the display device 112.

The document editing processing apparatus 100, shown in FIG. 1, according to the present invention, has the keyboard 108, mouse 109 or the pressure-sensitive tablet 111 as input means. It is, however, sufficient for the document editing processing apparatus 100 of the present invention to have only one of these input means, instead of all of the above-mentioned input means. Although not shown in FIG. 1, handwriting input means, for example, may be provided as data input means. If the document editing processing apparatus of the present invention is to be realized in a portable equipment carrying a liquid crystal display, the pressure-sensitive tablet 111 may be provided on the display device.

The document editing processing apparatus 100 includes a CPU (central processing unit) 101 for controlling the entire internal constituent elements. This CPU 101 is connected to a ROM 102 and a RAM 103, while being connectable to a card slot 104 for connecting to variable cards 105, a floppy disc drive (HDD) 121, a hard disc drive (HDD) 122 and to a CD drive 123. The CPU 101, as a main controller, is configured for executing variable programs under control by an operating system (OS).

The ROM 102 is a non-volatile memory for permanently storing a basic program, termed an operating system (OS), a mouse 109, a pressure-sensitive tablet 111, cords for operating respective hardware pieces, such as a video controller 112 (BIOS; basic input/output system) or a self diagnostic program (POST, power on self test).

If the document editing processing apparatus of the present invention is to be realized in a portable equipment not having a hard disc, a document inputting and conversion processing program for realizing the input data conversion processing is stored in the ROM 102. Specifically, a document editing program for performing variable document editing operations, such as letter insertion or deletion or duplication, a kana-kanji conversion program for executing the kana-kanji conversion processing, word dictionaries, exemplary sentence dictionaries, letter font data for display, figure or picture information or moving picture information or the like multi-media information, are stored in the ROM.

If the document editing processing apparatus of the present invention is to be realized in an equipment having an external storage device, such as a personal computer, the document input and conversion processing program for realizing the input data conversion processing according to the present invention, a kana-kanji conversion program for executing the kana-kanji conversion processing, word dictionaries, exemplary sentence dictionaries, letter font data for display, figure or picture information or moving picture information or the like multi-media information, are stored in e.g., a hard disc, a CD or a memory card.

The ROM 103 includes a work area for a program executed by the CPU 101 and an area for transient storage of input data. Specifically, the RAM includes a document data area for storage of document data, made up of kana or kanji characters, and a display data area for demonstration on a display device 113.

The CPU 101 executes processing of data stored in the RAM 103 in accordance with variable processing programs and control programs stored in the hard disc or ROM. The CPU 101 also is responsive to variable processing programs to read out data from the card 105 connected to the card slot 104, HDD 121, HDD 122 or from the CD drive 123 to transfer the read-out data to the RAM 103 or to transfer the data stored in the RAM 103 to the variable recording mediums.

The interfacing circuit (I/F) 107 operates as an interface for retrieving coordinate values commanded from the input scan code from the keyboard 108, mouse 109 or from the pressure-sensitive tablet 111 as computer data.

The document editing processing apparatus 100, shown in FIG. 1, according to the present invention, further includes an audio controller 124 and a loudspeaker 125 and is configured for reproducing audio data based on the control by the CPU 101.

The video controller 112 is a dedicated controller for actually processing a drawing command from the CPU 101, and is configured for transiently writing the processed drawing information on a picture buffer (VRAM) 113 and reading out the picture information from the VRAM 113 to output the display data to a display device 114 such as liquid crystal display device (LCD) or a cathode ray tube (CRT). The video controller 112 has e.g., a function of an XGA (eXtended Graphic Array) function or SVGA (Super Video Graphic Array) function, and supports the picture display function of the bit map representation system. For example, if the document editing processing apparatus of the present invention is to be realized in e.g., a portable equipment, the above-mentioned interfacing (I/F) circuit 107 and the video controller 112 may be configured as ASIC.

The display device 113 is constituted e.g., by a CRT or a liquid crystal display device. If the pressure-sensitive tablet 111 is provided as data input means, the pressure-sensitive tablet 111 may be provided on a surface of a liquid crystal device constituting the display device 113.

The pressure-sensitive tablet 111 generates coordinate position signals indicating the coordinate of the position on its surface touched by an input pen. The coordinate position signals, generated by the pressure-sensitive tablet 111, are converted by an analog/digital converter 110 into digital data (coordinate position data) which are routed over an interface to a CPU 101. The CPU 101 verifies which information is being input from the input pen 25, based on the display coordinate position of the contents actually demonstrated on the display device 113 and on the coordinate position data input from the pressure-sensitive tablet 111.

Into the card slot 104 can be inserted the card 105 conforming to the standard formulated by e.g., PCMCIA (Personal Computer Memory Card International Association)/JEIDA (Japan Electronic Industry Development Association). Typical of the card 105 are SCSI cards, such as a memory card, a modem card or a LAN card, for realizing network connection, and HDD cards operating as an external memory of a PC.

The document editing processing apparatus 100 of FIG. 1 is adapted to be connectable to the floppy disc drive (HDD) 121, hard disc drive (HDD) 122 or to the CD drive 123, as external memories. The hard disc is superior to other external memories in accessing speed and, if a software program (OS, device driver or the application) is copied to the hard disc 122, that is installed on the system, the software becomes usable by the system, that is by the document editing processing apparatus 100.

In the document editing processing apparatus of the present invention, document inputting and conversion processing program for realizing the input data conversion processing, that is the kana-kanji conversion program for executing the character font data for display, figure or picture information, speech information, or the moving picture information, or the like multimedia information, can be stored and used in the hard disc. Alternatively, the variable programs, word dictionaries, exemplary sentence dictionaries, character font data for display, figure or picture information, speech information or the moving picture information, or the like multimedia information, can be stored in a CD or in a memory card, or invoked form the variable recording mediums, in case of necessity.

If the keyboard 108 or the mouse 109 is used to input data, an editing command can be selectively specified by demonstrating an input character string or an editing command key on the display device 113 and moving a mouse cursor actuated by the mouse to click the editing command key. The same holds for the selection processing of a conversion candidate word, a conversion candidate for figure or a conversion candidate picture. That is, the cursor is moved from a keyboard or by a mouse operation to specify and select words, pictures or other multimedia data.

The power source obtained from a main battery 116 or an AC adapter 115 is supplied through a power source block 114 as a power source circuit to respective constituent elements. The document editing processing apparatus 100 also includes a backup battery 117 for the RAM 103 and, if the power source from the main battery 116 or the AC adapter 115 is not available, the RAM 103 is backed up by this backup battery 117 to hold the storage data for the RAM 103.

Figure 2:
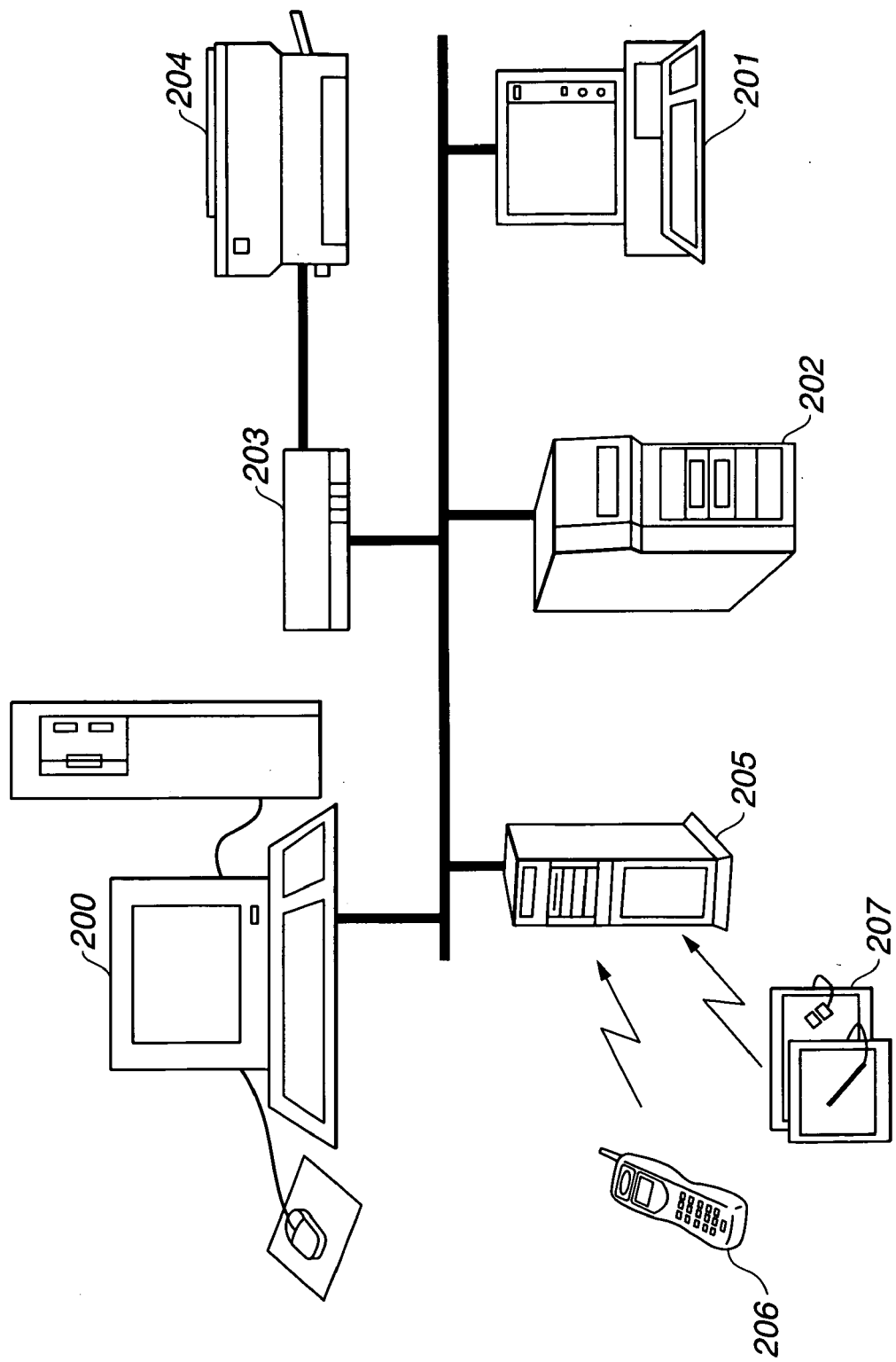
FIG. 2 is a conceptual view showing the structure of the document editing processing apparatus of the present invention connected to n external equipment over a network.

FIG. 2 shows the overall appearance of the document editing processing apparatus 100 of the present embodiment and a typical system configuration wherein the document editing processing apparatus is connected to other equipment over a network.

In a network system, shown in FIG. 2, the document editing processing apparatus of the present invention is comprised of a personal computer 200, having a display, a keyboard and a mouse, with the personal computer 200 being connected to an other personal computer 201, capable of editing documents or to a file server 202 having variable data files stored therein, over a network, such as a home network, prescribed by the IEEE 1394, LAN such as Ethernet or a global network, such as Internet. There is also connected to the network system a printer 204 for printing out a document edited by the personal computer 200 through a print server 203.

Moreover, the personal computer 200 or the file server 202, connected to the network, is configured for communicating with variable portable terminals 206, 207 through a network server 205, and is capable of editing the document on the portable terminals 206, 207. In addition, editing documents can be transmitted/received between the portable terminals 206, 207 and the personal computer 200. Meanwhile, if a program for executing the document editing processing according to the present invention is stored in the portable terminals 206, 207, the document editing processing apparatus 100 of the present invention can be implemented in these portable terminals 206, 207.

The document preparing processing, executed by the document editing processing apparatus 100 of the present invention, configured as described above with reference to FIG. 1, is now explained in detail based on a practical embodiment.

If the conversion processing for an input character string is to be carried out in the pre-existing document inputting technique, the routine practice is for a user to supply the totality of the information as required. For example, in a pen input computer employing the handwriting character recognition system, the character is input only when the user writes the character correctly. On the other hand, in a computer employing the keyboard and the kana-kanji conversion system, kana-kanji conversion takes place only when a correct reading of a character string is input from a keyboard and the conversion processing is executed. For example, if it is desired to demonstrate a Chinese character (kanji) 感謝 (gratitude, uttered as "kansha")" on a display, it is necessary to input the reading かんしゃ(uttered as "kansha")" before proceeding to conversion processing.

In the document editing processing apparatus of the present invention, the partial information pertinent to a letter string desired to be input, for example, the leading character in the character string desired to be input, or several characters contained in an input character string, is set as a retrieving condition. Plural candidates of document constituting elements, such as characters, words or paragraphs, collectively referred to below as words, multimedia information, such as figures, still images or moving picture information, collectively referred to below as image data, speech information or variable programs, are demonstrated on a display, the words or the multimedia information as necessary are selected from among these candidates, and the words and the multimedia information so selected are sequentially joined together to execute the document inputting preparing processing. So, the sentence can be input and edited without inputting the complete information pertinent to the character string, such s the complete reading, to render it possible to prepare a document with high visual effect in which there co-exist plural the multimedia information pieces, such as characters, figures, image data or the moving picture information.

Figure 3:
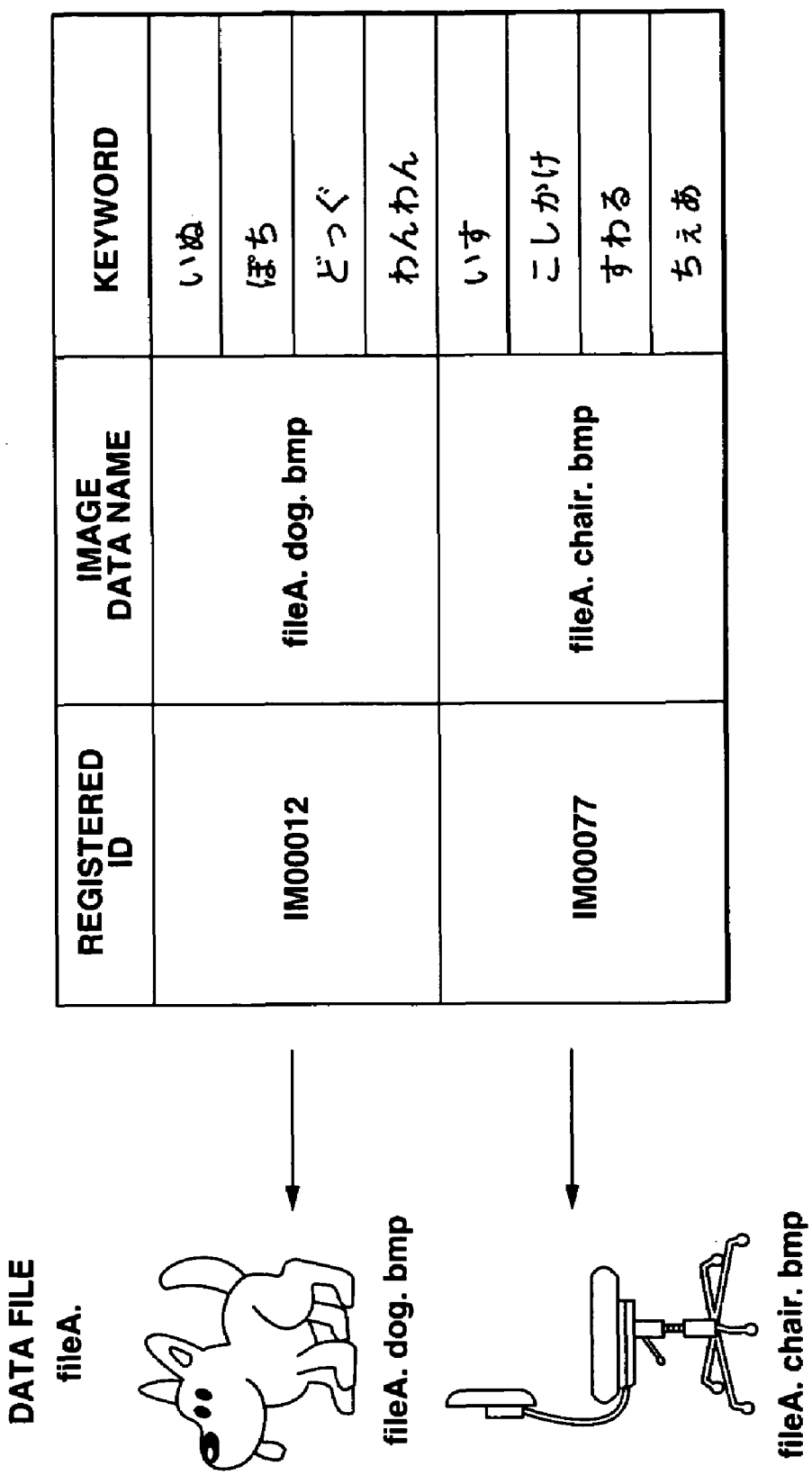
FIG. 3 shows an example of a multimedia information registration table in the document editing processing apparatus according to the present invention.

The multimedia information pieces of the present invention, such as figures, images, speech information or moving picture information, are registered in association with keywords. In the following, still image data, as representative of the multimedia information, is mainly explained. FIG. 3 shows a typical registration table of image data which has registered a still image. With the document editing processing apparatus of the present invention, not only still images, but also a variety of other multimedia information pieces, such as moving picture information, speech information or other programs can be invoked, based on the data input, such that a variety of moving picture information pieces, speech information or other programs can be registered in the same manner as in the image table shown in FIG. 3.

FIG. 3 shows examples of image data of "犬(dog, uttered as "inu")", image data of いす(chair, uttered as "isu") "and a registration table for these image data.

In a multimedia information registration table, shown in FIG. 3, image data of 犬(dog, uttered as "inu")" is associated with a registered ID IM00012" as a registered identifier, and with keywords, such as いぬ(dog)", ぽち(name of a dog)",どっぐ(dog)" and "わんわん(bark of a dog)". On the other hand, image data of いす(chair, uttered as "isu")" are associated with a registered ID "IM00077" and with keywords いす(chair)", こしかけ(bench)", すわる(sit)" and ちぇあ(chair)".

In the registration table of the image data, shown in FIG. 3, there are shown registration modes of image data of a dog and a chair. However, in the registration table, shown in the example of FIG. 3, only image data names are entered, whilst real image data are stored in a separate file and invoked for use based on the image data name of the table. So, the image data file and the registration table are corelated based on the image data name. The image data name is image accessing data for accessing an image memorized in the storage means, and has the function as address data specifying the storage means in which the image is stored. If there are not provided plural image files, the registration table can be unified with the image data file.

Based on the image data names, registered in the multimedia information registration table, image data are invoked from the respective image data files for demonstration on a display device 120. The image data that can be demonstrated on a display, such as bit map data, CIF data, PICT data or JAVA SCRIPT data, can be registered in the multimedia information registration table.

These image data can be held as they are distributed into plural data files. For example, the image data can be stored in an HDD 121, an HDD 122 or in a CD drive 123 of FIG. 1 so as to be invoked as necessary. If the document editing processing apparatus of the present invention is to be implemented in a portable equipment not having these external storage devices, it is sufficient if these data are stored in the ROM 102 or in the memory card 105. The image data of the respective files are retrieved and extracted based on the image data names of the multimedia information registration table shown in FIG. 3.

If the document editing processing apparatus of the present invention is to be implemented in a network configuration shown in FIG. 2, image data can be retrieved from the file server 202 by storing specified image data files in the file server 202 and by registering an address specifying a picture in the file server 202 in an image data name in the registration table stored in the personal computer 200.

By configuring the multimedia information registration table so that it may be stored in a write enable recording medium, such as a hard disc, a user is able to register a newly prepared image data, as read from a scanner, in the multimedia information registration table. If image data is to be registered in the multimedia information registration table, it is registered in association with one or more keywords. This applies for multimedia information pieces other than the moving picture, speech information or variable programs.

The keywords registered in the multimedia information registration table are associated with a word dictionary or an exemplary sentence dictionary, as later explained. An image is selected, based on the keyword, if the retrieving conditions are met on retrieval by a word or exemplary sentence dictionary based on the user-input reading or an ultimate character string, such that the image data as selected is demonstrated as candidate data on the display device. The relation between the word dictionary, exemplary sentence dictionary and the multimedia information registration table will be explained later.

It is possible with the document editing processing apparatus of the present invention to invoke not only still image but also variable multimedia information pieces, such as moving picture information, speech information or other programs, based on the data input. By substituting the name of the moving picture information for the image data name and by substituting the moving picture data file for the data file in the image table shown in FIG. 3, the moving picture information can be invoked based on the keyword. By substituting the speech information for the registered image data in the image table and by substituting the data file for the speech data file or variable program files, in the registered image data names in the image table, the speech information and variable programs can be invoked, based on the keyword. The explanation herein is centered about the processing of still image data to facilitate the understanding.

In the columns of the image data names of the registration table, there are registered data names of the corresponding images. Based on these registered names, the image data are extracted and demonstrated on the display device 113. The data inputting processing is carried out as shown for example in FIGS. 4 to 6.

Figure 4:
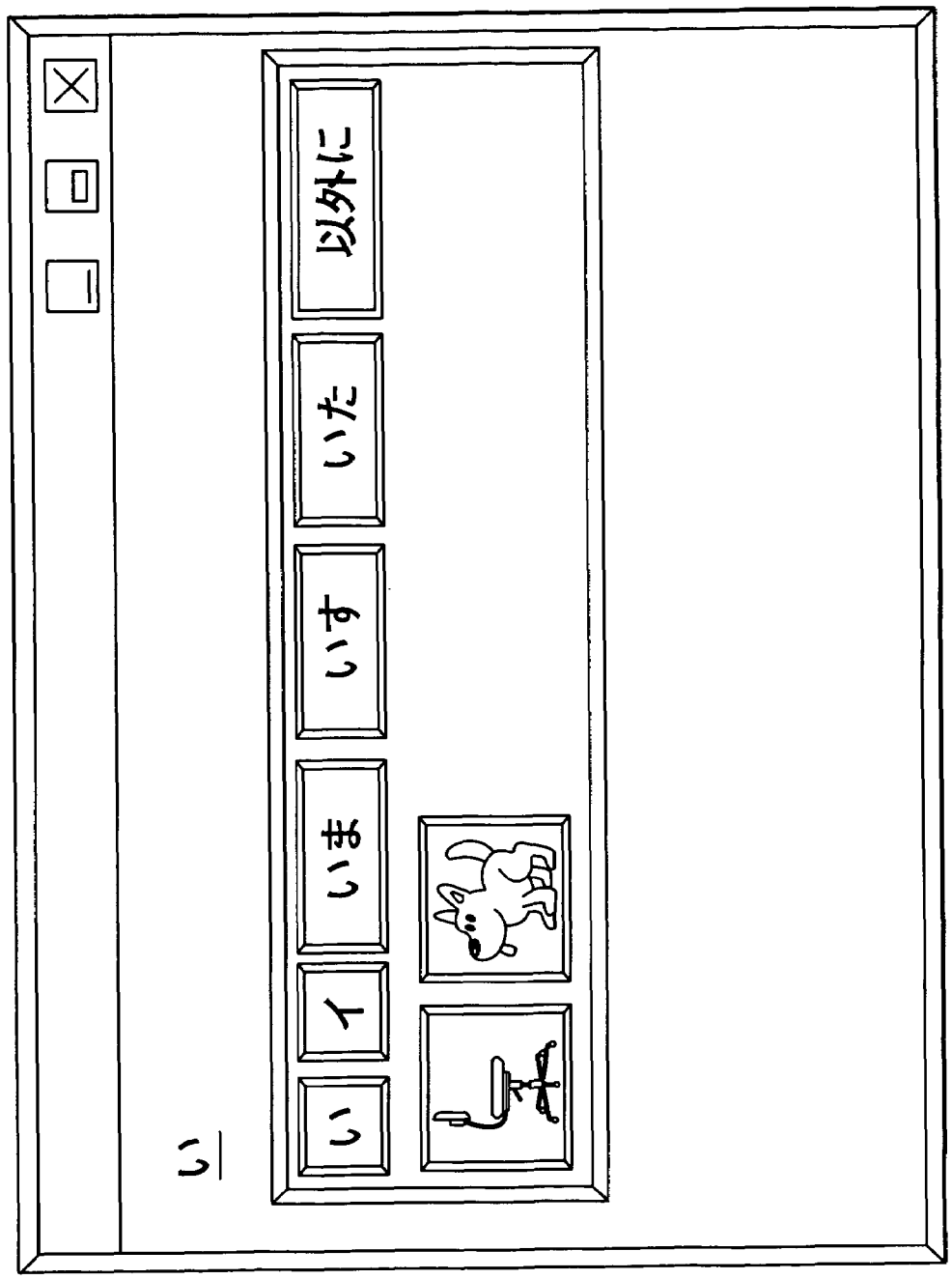
FIGS. 4, 5, 6, 7, 8, 9A, 9B, 9C and 9D, 10E, 10F, 10G and 10H illustrate several examples of the document inputting processing in a document processing apparatus according to the present invention.
Figure 5:
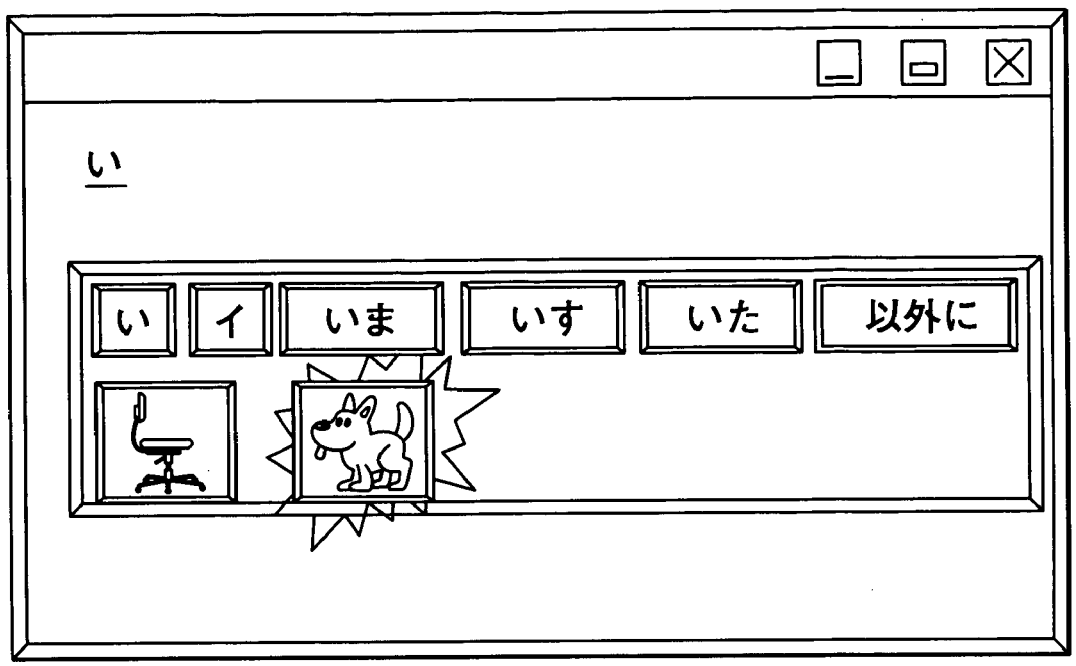
Figure 5:
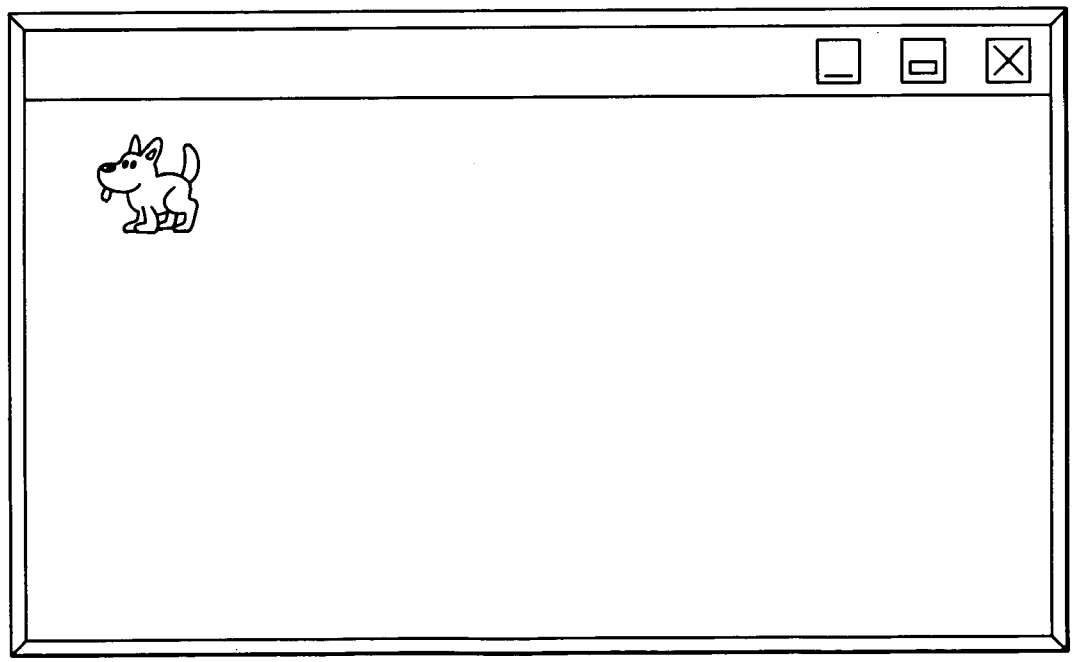
Figure 6:
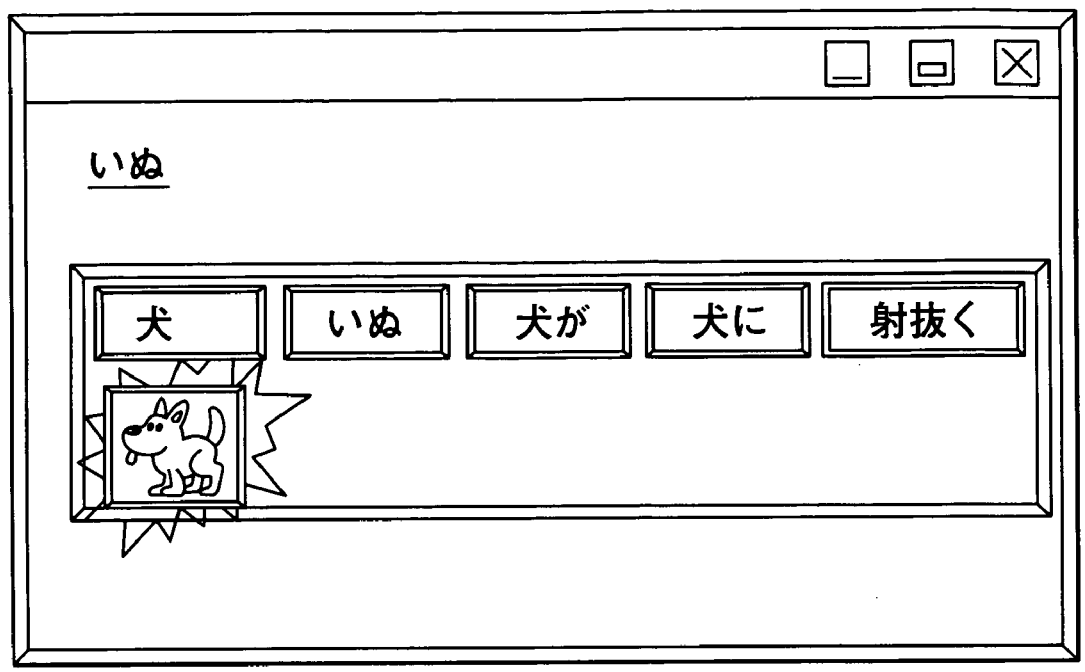
Figure 6:
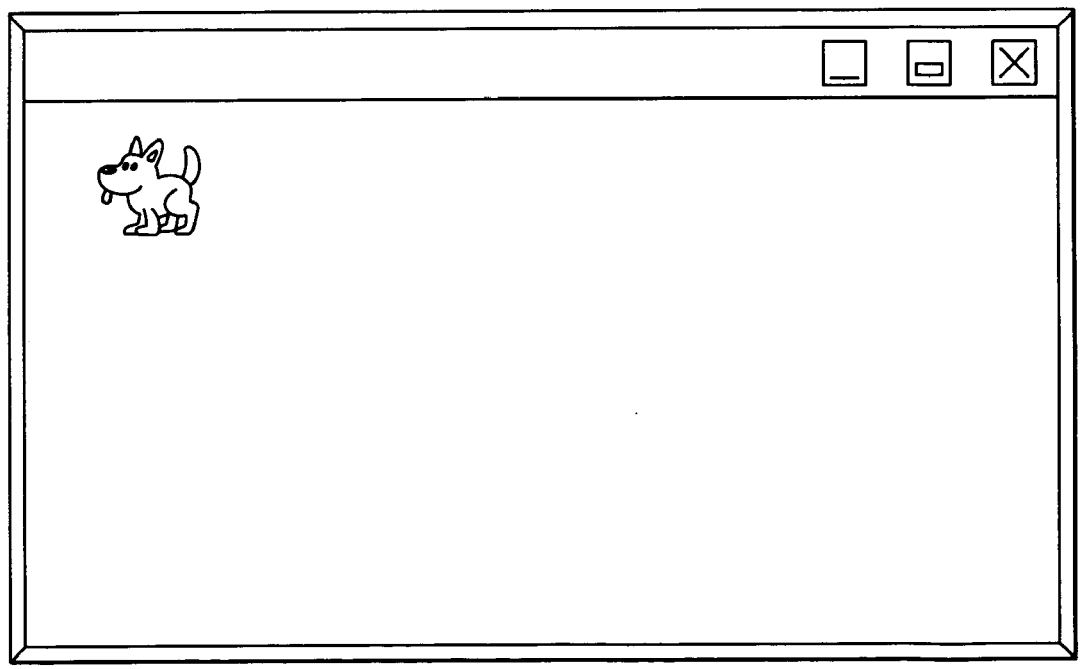

Before proceeding to description with reference to FIGS. 4 to 6, the basic configuration for executing the processing for preparing a document containing both characters and images, in the document editing processing apparatus of the present invention, is explained.

The first basic configuration resides in the configuration of imparting retrieving conditions for conversion candidate data based on a simple operation.

The second basic configuration resides in retrieving a set of candidate words and images as the set is dynamically changed with changes in the retrieving conditions to select the word or the image from the set.

The third basic configuration resides in selecting a target word or image from plural candidates displayed as retrieved results.

For realization of the above-described basic structures, the following specified techniques are used.

First, in specifying the retrieving conditions, part of the reading of the input character string is specified as a retrieving condition, with the aid of e.g., a keyboard. That is, the retrieving condition for retrieving words or images desired to be input is specified by pressing keys corresponding to only the leading end character, only a few characters sequentially from the leading end of the character string or to a few characters optionally picked up from the leading end of the character string to specify the retrieving conditions for retrieving the word or image desired to be input.

In an input employing a pressure-sensitive tablet, an input pen is sequentially moved on a display screen to input the leading end character or a few characters sequentially from the leading end for use as the retrieving condition.

If, in the retrieval, demonstration and selection of the multimedia information pieces, such as words or images as candidates for conversion, part of the reading of the input character string is specified, a set of the multimedia information pieces, such as candidate words beginning from the specified reading, and images having the associated keyword, is presented as an object of selection. That is, if the retrieving condition (reading) for retrieving the word desired to be input is specified, the multimedia information pieces, such as plural words and images pursuant to the retrieving condition (reading) are demonstrated as conversion candidates.

However, if the designation of the retrieving condition has been changed, demonstration of the multimedia information pieces, such as candidate words or images, are instantly changed. For example, if a second character is input, in succession to a first input character, as the first character is as yet not defined, the retrieving condition is changed from the retrieving condition under which the first character is input, such that the demonstration of the multimedia information pieces, such as candidate words and images, is changed. For example, at a time point when the reading い(uttered as "i")" is input, both "image of a dog" and "image of a chair" become candidates for conversion, and are demonstrated as the candidate images. However, if the reading ぬ(uttered as "nu")" is input in succession while the reading い(uttered as "i")" is not defined, the いぬ(dog, uttered as "inu")" becomes the retrieval condition, whilst the "image of a chair" cannot be selected as the candidate for conversion and hence is eliminated from the object of demonstration as a candidate image. In the following, explanation will be made in detail with reference to specified examples.

The specified document inputting mode is explained with reference to FIGS. 4 to 6. Here, an example of inputting image data of a 犬(dog, uttered as "inu")" is shown.

If, using the keyboard 108 shown in FIG. 1, a key い(uttered as "i")" is pressed, the い(uttered as "i")" is specified as the retrieving condition (reading). If い(uttered as "i")"is specified in this manner as the retrieving condition, a set of plural candidate words and images, beginning with い(uttered as "i")", is demonstrated as a conversion candidate menu on a display screen of the display device 113, as shown in FIG. 4.

As for the conversion candidate menu, N candidate words, where N is an integer equal to or less than e.g., 10, beginning with い(uttered as "i")", and which are arrayed in the order of diminishing frequency of occurrence, herein い(uttered as "i")", イ(uttered as "i")", いま(now, uttered as "ima")", いす(chair, uttered as "isu")", いた(plate, uttered as "ita")" and 以外に(excluding, uttered as "igaini")", are demonstrated as a menu item. In addition, image data of "chair" and "dog" are demonstrated as image data. In the embodiment shown in FIG. 4, a word is demonstrated first and followed by image data. This, however, is not limitative, since the image and the word may co-exist, or the image may be first displayed and followed by a word.

In the following explanation, the respective menu items, demonstrating the candidate words and candidate images, are termed menu keys. The number N of the candidate words and candidate images, demonstrated as the conversion candidate menu, can be optionally set and may be smaller or larger than the number shown in FIG. 4. The numbers of the candidate words and images displayed are determined taking into account the size of the image display and the other display contents.

FIG. 5 shows the state in which the reading い(uttered as "i")" and in which the "image of a dog" has been selected from the displayed conversion candidate menu. The lower half of FIG. 5 shows the state in which conversion of the input い(uttered as "i")" has come to a close.

If a keyboard or a mouse is used as input means, the processing for selection from the conversion candidate menu may be executed by a cursor movement and by designating processing by the keyboard or the mouse. If a pressure-sensitive tablet is used for inputting data, selection may be by an input pen.

In the state shown on the lower side of FIG. 5, a document can be input next to the image data of a dog, such that, by inputting a new reading, a new conversion candidate menu can be displayed.

FIG. 6 shows an instance of a conversion processing executed in a mode different from that of FIG. 5. FIG. 5 shows the processing in which only one character い(uttered as "i")" is input as reading and the "image of a dog" is selected from the conversion candidate menu displayed to define the character. FIG. 6 shows another instance in which, after inputting one character い(uttered as "i")" and, as the conversion processing is not as yet defined, that is without performing the processing for selection, two characters いぬ(dog, uttered as "inu")" are input.

In an upper half of FIG. 6, there is shown a state in which two characters いぬ(uttered as "inu")" has been input as a reading. As the conversion candidate menu of FIG. 6, N candidate words, arrayed in the order of decreasing occurrence frequency, herein 犬(dog, uttered as "inu")", いぬ(dog, uttered as "inu")", 犬が(dog in the subjective case, uttered as "inu-ga")", 犬に(dog in the dative case, uttered as "inu-ni")" and 射抜く(shoot through, uttered as "inuku")", among the words beginning with いぬ(uttered as "inu")", are demonstrated as menu items, and further the "image data of a dog" is demonstrated as image data.

Since the retrieving condition for conversion candidates is changed by inputting a reading, the conversion candidate menu shown in the upper half of FIG. 5, that is the conversion candidate menu which is based on the reading い(uttered as "i")", differs from the conversion candidate menu, shown in FIG. 6, which is based on the reading いぬ(uttered as "inu")". The word candidates in the conversion candidate menu shown in FIG. 5 differ totally from the word candidates in the conversion candidate menu shown in FIG. 6. Moreover, the "image data of a chair" in the conversion candidate menu shown in FIG. 5 is absent from the conversion candidate menu of FIG. 6. That is, N candidate words, arrayed in the order of decreasing occurrence frequency, and candidate images, among the words the reading of which begins from いぬ(uttered as "inu")" and the image data associated by the keyword, are displayed in the conversion candidate menu.

When this display is made, a user is able to selected e.g., the "image data of a dog", to define the conversion processing for the input reading いぬ(uttered as "inu")".

An instance of predictive candidate selection processing of calculating the likelihood of occurrence of the next word or image in an input part of a document being prepared, from the defined character string, directly previous to a position of a reading input by the user, from the ordinary occurrence frequency of a word or an image, or from the context, and of displaying the conversion candidate words or images in the conversion candidate menu in the order of the decreasing value of the calculated likelihood, is hereinafter explained.

The processing for retrieving candidate words or images in the predictive candidate selection processing is realized using exemplary sentences previously stored in storage means, such as ROM. From the already defined directly previous character string, the next input word or image is predicted and presented preferentially to the conversion candidate menu. If, when the already determined directly previous character string ends in よろしく(please, uttered as "yoroshiku")", and a reading を(Oblige, uttered as "wo")", a word お願い(me, uttered as "onegai")" is preferentially displayed as a candidate.

In the document editing processing apparatus according to the present invention, a registration table, explained e.g., with reference to FIG. 3, is retrieved, and the multimedia information, such as image data, with which the word is associated as a keyword, is preferentially presented as conversion candidate in the conversion candidate menu.

With the document editing processing apparatus, exemplary sentences, stored in memory means, are generated as a hybridized multimedia information document, containing e.g., images, one or more of the exemplary sentences thus stored is selected from the already defined multimedia information pieces, such as characters or images, directly previous to the word input position, and the multimedia information pieces, such as images, contained in the selected exemplary sentences, are presented as conversion candidates in the conversion candidate menu. The hit rate can be improved by registering the hybridized multimedia information document, such as images, once formulated, as exemplary sentences in the user dictionary, and by retrieving exemplary sentences using the user dictionary in attempting the next prediction.

If no exemplary sentences matched to the retrieving condition are found at the time of retrieving the candidate words or the multimedia information pieces, candidate multimedia information pieces, such as words or images, having a higher using frequency, or the words or the multimedia information pieces selected of late, are retrieved, based on the input reading, to preferentially present the words or the multimedia information pieces, matched to the input reading, as candidate words or multimedia information pieces. If there is no word matched to the retrieving condition, ambiguity retrieval, as later explained, is performed to present words close to the retrieving condition as candidates. The plural multimedia information pieces, such as plural candidate words or images, prove objects for selection at the time of selecting a word or words desired to be input. Meanwhile, the set of the multimedia information pieces, such as candidate words or images, is demonstrated on a display area constituting a portion of the display device.

Figure 7:
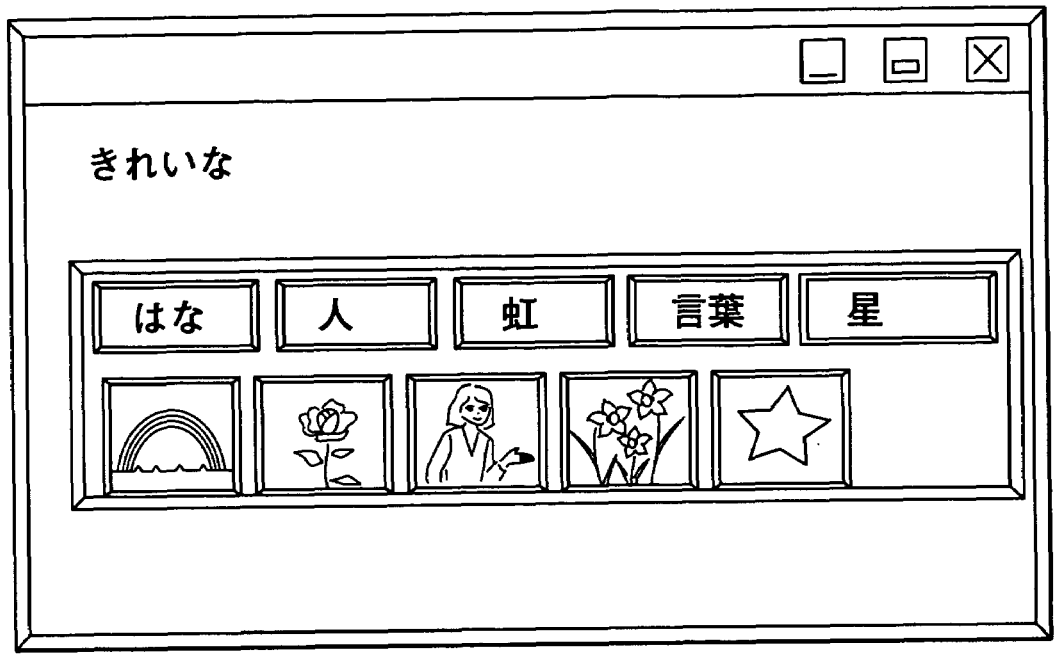
Figure 7:
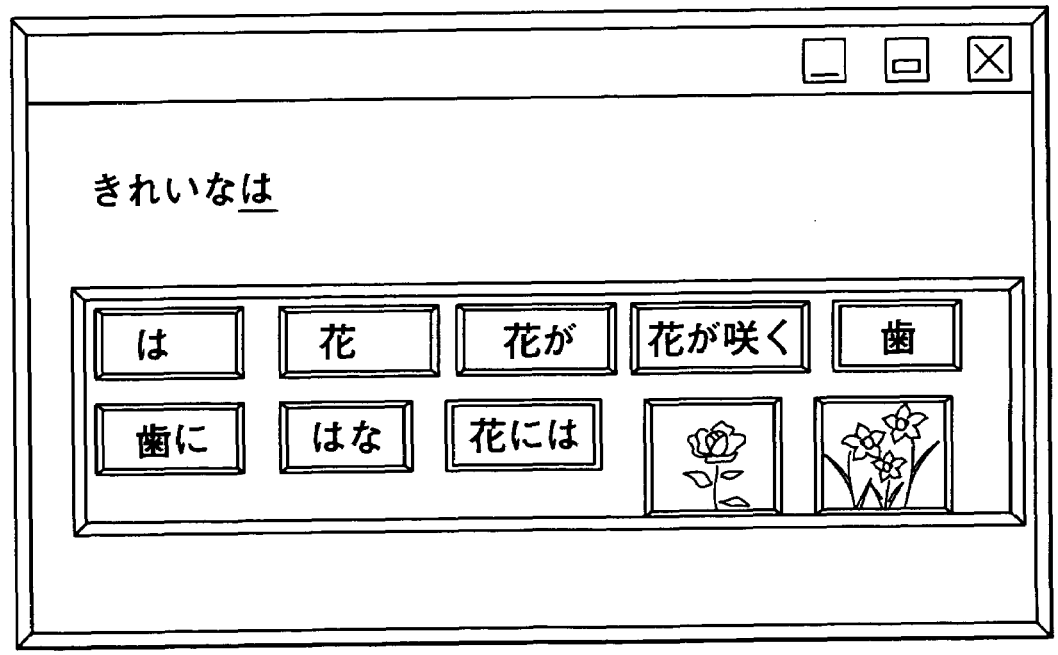

FIG. 7 shows an instance of preparing a document inputting and formulating processing, in which the likelihood of occurrence of the multimedia information, such as the next word or image in the input portion in the document being prepared, is calculated, and in which the multimedia information pieces such as the conversion candidate words or images are displayed in the conversion candidate menu, in the completed state of the processing.

If a character きれいな(beautiful)" is demonstrated in a defined state on a picture display, as shown for example in FIG. 7, a set of candidate words and images, having a high likelihood of occurrence directly after the defined character string きれいな(beautiful)" is demonstrated as a conversion candidate menu.

The candidate words of the set, having high likelihood of occurrence directly after the defined character string, きれいな(beautiful)", may be exemplified by, for example, はな(flower)", 人(person)", 虹(rainbow)", 言葉(language)", 星(star)", and further, "image of a rainbow", "image of a flower (rose)", "image of a woman", "image of a flower (lily)", or "image of a star", these being demonstrated in the conversion candidate menu shown in the upper half of FIG. 7.

In the state of the upper half of FIG. 7, the user is able to select an optional desired candidate from the conversion candidate menu and to input the reading. The lower half of FIG. 7 shows the state in which a reading は(uttered as "ha")" has been input next to the defined character string きれいな(beautiful)".

The retrieving condition at this time is to extract candidate words and images beginning from the reading は(uttered as "ha")". Thus, as shown in the lower half of FIG. 7, は(uttered as "ha")" . . . 花には(to a flower, uttered as "hananiwa")" are displayed as candidate words beginning from the reading は(uttered as "ha")" and "image of a flower (rose)" and "image of a flower (lily)" are displayed as image data to which is associated the keyword beginning from the reading は(uttered as ha")". The user is able to select and fix an optional word or image from among these conversion candidates.

By the above processing, it is possible to prepare a hybridized document of character strings and image data easily and speedily.

In the document editing processing apparatus according to the present invention, in which the an input reading of one character or an input a character string of one or more characters is used in retrieving a conversion candidate word or image and the retrieved result is displayed on a screen to enable the selection by the user, it is possible for a document formulator to define the required word or image by selection before inputting the entire reading and hence to prepare a hybridized document of image and words easily and speedily.

In the document inputting and formulating processing which realizes the predictive candidate selection processing, the next input word and image can be predicted from the character string already defined to display the word or image on a display for selection, so that the document formulator is able to predict the next input word and image from the character string already defined to display the predicted word or image as the conversion candidate menu. So, the document formulator is able to select the next following word, document or image, without inputting the reading, to formulate the hybridized document speedily.

In the foregoing instance, an operation and a display instance of inputting hiragana characters, similar processing may be made in inputting Roman letters.

Figure 8:
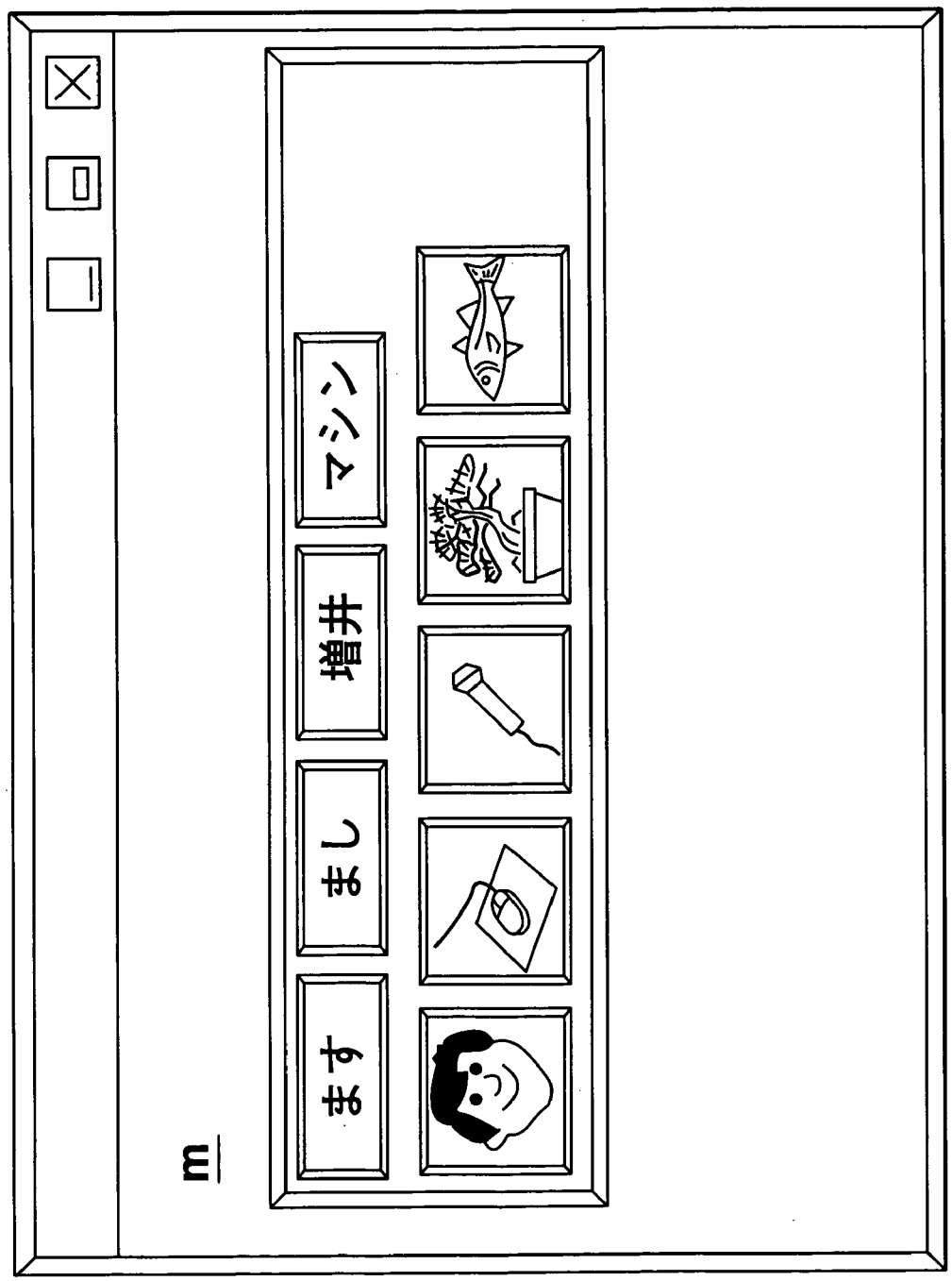

FIGS. 8 to 10 illustrate an inputting instance of inputting Roman letters. In the case of inputting Roman-characters, if m" is input as an input letter, as shown in FIG. 8, there are displayed words beginning from ま、み、む、め、も (uttered as "ma, mi, mu, me, mo, respectively")" and keyword-associated images. Here, ます (trout, uttered as "masu")", まし (increasing, uttered as "mashi")", 増井 (name of a person, uttered as "masui")", and マシン (machine, uttered as "mashin")" are displayed as candidate words. In addition, "image data of Mr. Masui", "image data of a mouse", "image data of a microphone", "image data of a pine tree" and "image data of a trout" are displayed.

FIGS. 9 and 10 show the state of inputting processing for Roman letters. FIG. 9*a* shows the state similar to that of FIG. 8. FIG. 9*b* shows the state in which "mas" is input, the retrieving condition is changed to words beginning with "mas" and keyword-associated images and the contents of the conversion candidate menu have been changed. The "image data of a mouse", "image data of a microphone" and "image data of a pine tree" are deleted from the image data so that only "image data of Mr. Masui" and "image data of a trout" are left.

Figure 9A:
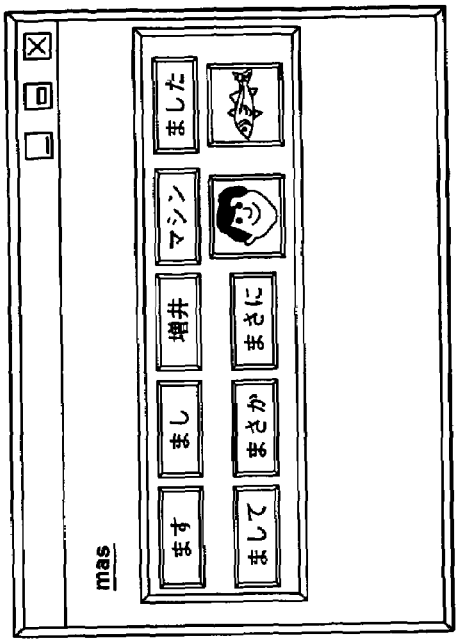
Figure 9B:
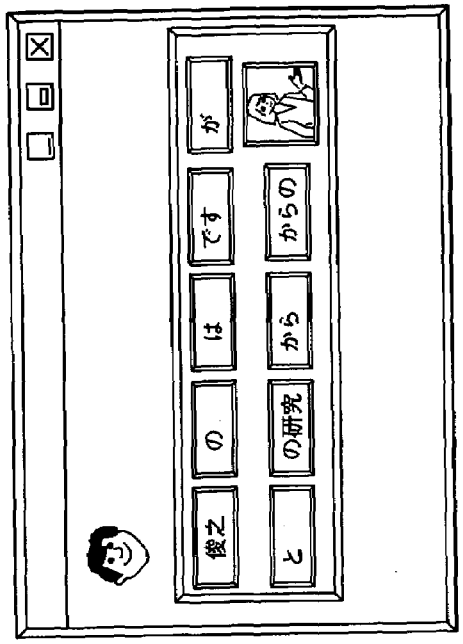
Figure 9C:
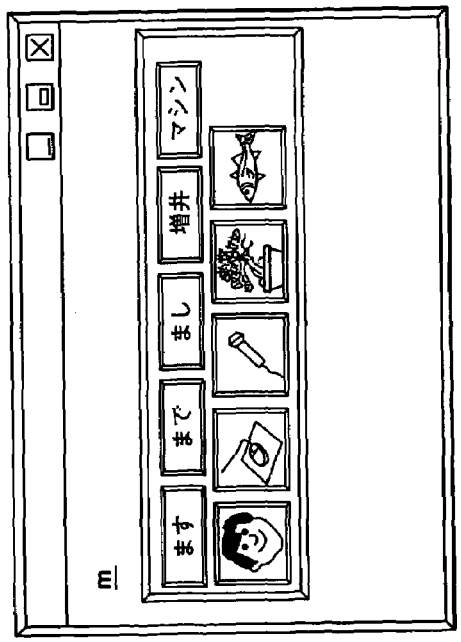

Moreover, in FIG. 9*c*, "masu" is input as a reading input, the retrieving condition is changed to a word beginning from "masu" and to keyword-associated images, and the contents of the conversion candidate menu have been changed.

Figure 9D:
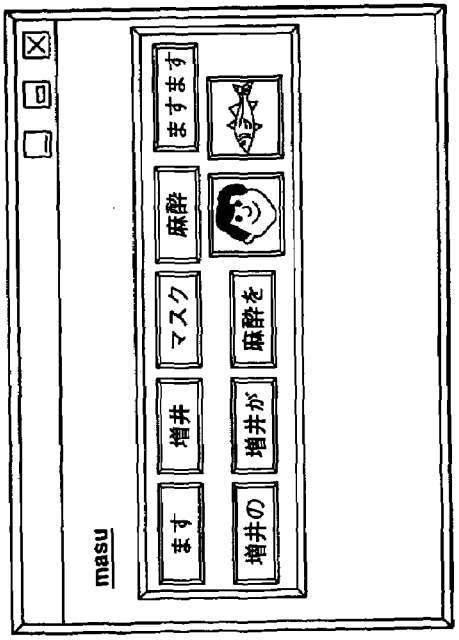

FIG. 9*d* shows the state in which a reading "masui" is input, and an "image of Mr. Masui" is selected and defined. In this case, a set of candidate words and candidate images, having high frequency of occurrence directly after the now defined "image of Mr. Masui", that is "Toshiyuki", . . . is selected as to candidates in accordance with the above-described predicted candidate selection processing and is demonstrated in the conversion candidate menu. The predictive candidate selection processing will be explained subsequently in detail.

Figure 10F:
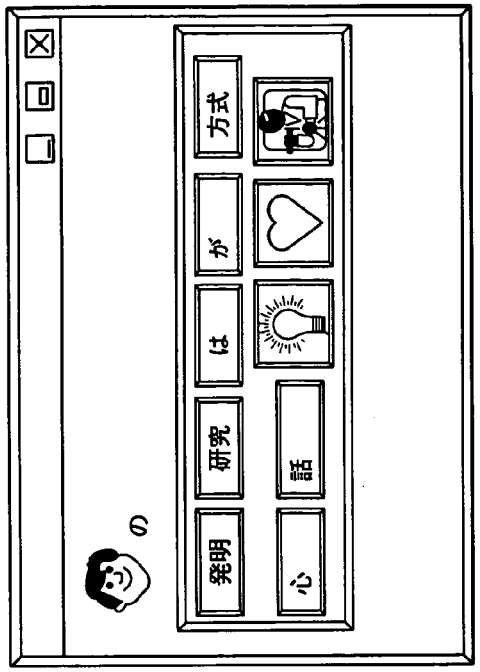
Figure 10H:
Figure 10E:
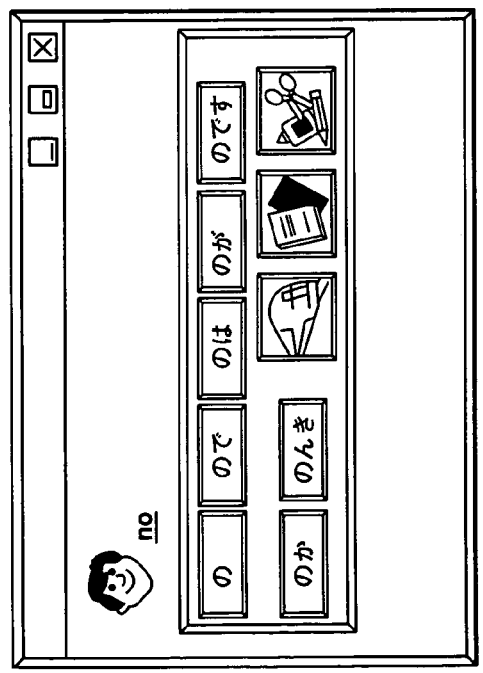

FIG. 10*e* shows the state in which "no" has been input after the "image of Mr. Masui". Here, words and keyword-associated images beginning from "no" are displayed. That is, の (uttered as "no")", ので (uttered as "node")", のは (uttered as "nowa")", のが (uttered as "noga")", のです (uttered as "nodesu")", のか (uttered as "noka")" and のんき (uttered as "nonki")", are displayed, whilst "image data of a carriage", "image data of a notebook" and "image data of paste" are also displayed.

FIG. 10*f* shows the state in which の (uttered as "no")" has become defined after the "image data of Mr. Masui". In this case, a set of candidate words and candidate images likely to appear directly after the "image data of Mr. Masui" and の (uttered as "no")", that is words such as 発明 (invention)", 研究 (investigations)", . . . , "lecture" and images such as "image data of an invention", "image data of a heart" and "image data of investigations", are displayed in the conversion candidate menu.

Figure 10G:
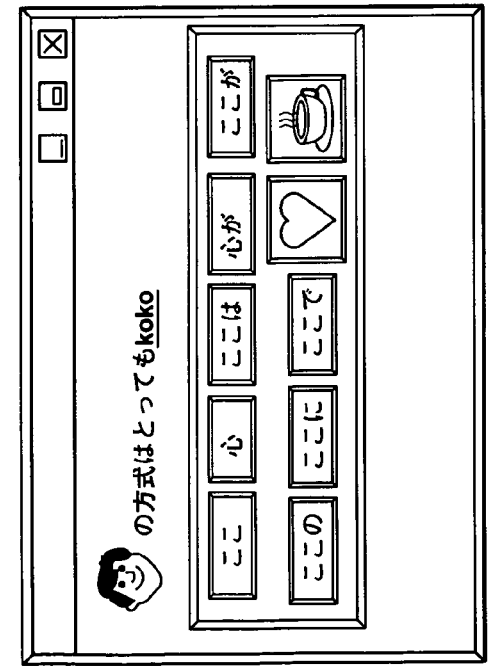

FIG. 10*g* shows the state in which inputting has proceeded further such that a set of candidate words and candidate images having an undefined reading "koko" has been displayed in the conversion candidate menu. As the conversion candidate images, "image data of a heart" associated with a keyword こころ (heart, uttered as "kokoro") "and "image data of cocoa" are displayed.

FIG. 10*h* shows the state in which sentence inputting has come to a close. Specifically, a document having inserted image data "image of Mr. Masui" and "image of a heart" is completed.

In preparing an English document, a hybridized image-English document, similar to that prepared in the case of inputting Japanese, can be prepared by using an English text accommodating dictionary and by registering image data in association with English keywords.

If, in the case of inputting English, a key "F" is pressed, "F" is designated as the retrieving condition (reading). If "F", for example, is designated as the retrieving condition, a set of plural candidate words beginning with "F" and candidate images associated with a keyword beginning with "F" are demonstrated on the screen display as a conversion candidate menu.

N candidate words, arrayed in the order of decreasing frequency of occurrence, among the words beginning from "F", such as "F", "for", "from", "figure", "first", "found", or "form" and "image data of a flower" or "image data of fruits" are displayed as menu items (menu keys).

So, in the case of English inputting, a hybridized image-document in English can be speedily realized, subject to a simple selection processing, as in the case of the Japanese inputting as described above.

In this manner, the technique for preparing the hybridized image-document in the document editing processing apparatus according to the present invention, which is particularly effective in the case of Japanese inputting accompanied by a conversion processing, such as hiragana kanji conversion, alphabetical letter hiragana conversion or in kanji conversion, but also in inputting a document in a language not in need of conversion processing, such as in English, German or French. In particular, in the document inputting technique according to the present invention, in which English words etc are input by selection from plural candidate words as described above, it is estimated that spell checking required necessarily in usual inputting of English documents is no longer needed.

For effectively realizing the document inputting technique according to an embodiment of the present invention, a word dictionary and an exemplary sentence dictionary, as explained with reference to FIG. 3, are necessary in addition to the multimedia information registration table explained in connection with FIG. 3.

Figure 13:
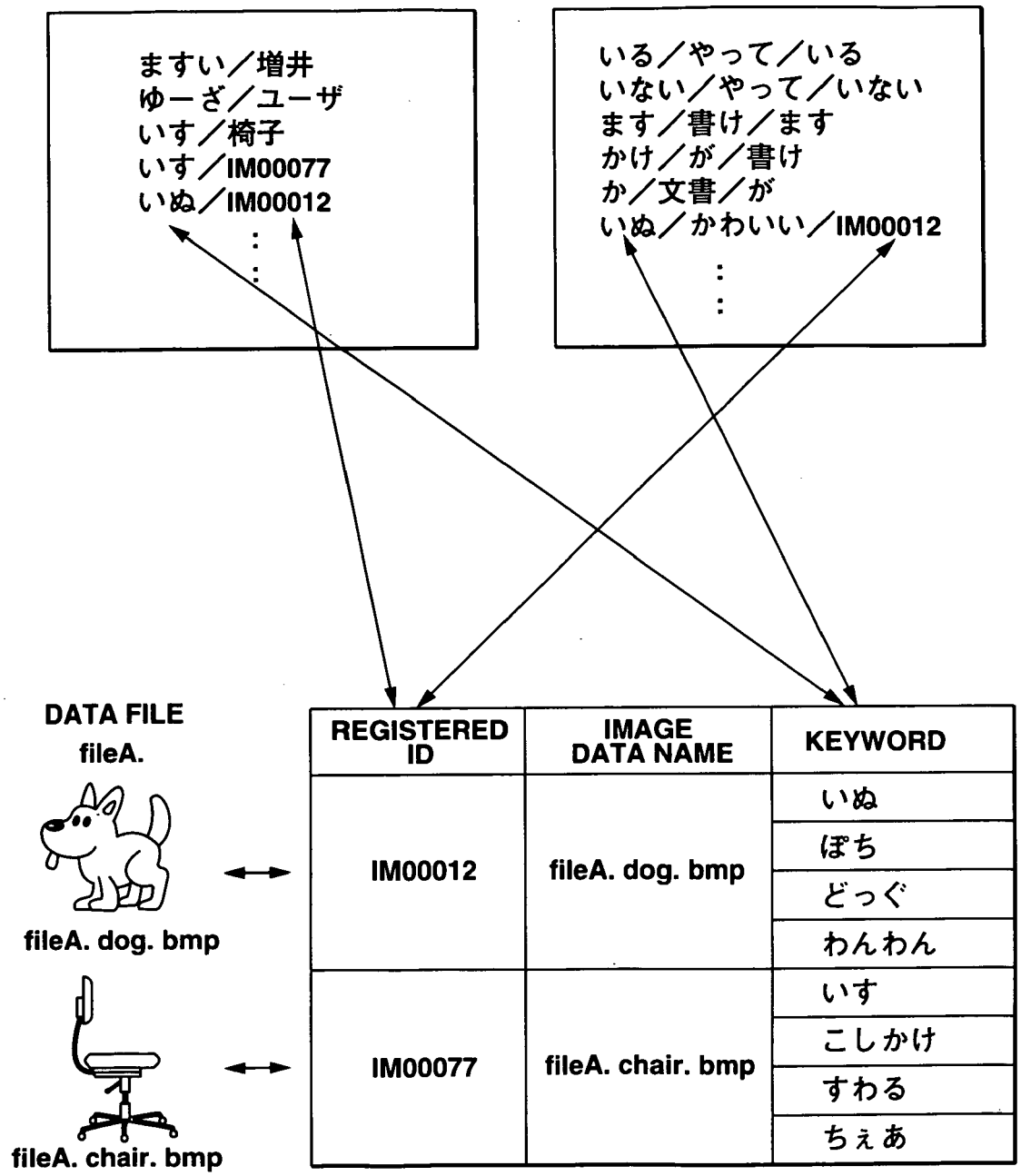
FIG. 13 illustrates the relation between the word dictionary, exemplary sentence dictionary and the multimedia information registration table as used in the document editing processing apparatus according to the present invention.

The word dictionary used in an embodiment of inputting in Japanese is of the type shown for example in FIG. 11. The word dictionary shown in this figure, is of a list structure having readings, that is reading data associated with candidate words, as first elements, and candidate words, that is candidate words to be displayed, as second elements, on the left and right sides of FIG. 11, respectively. In the word dictionary shown in FIG. 11, there are registered not only words but also data associated with registered IDs in the multimedia information registration table. For example, if the reading い(uttered as "i")" or the reading いす(chair, uttered as "isu")" is input, retrieval of the word dictionary, based on the retrieving condition い(uttered as "i")" or いす(chair, uttered as "isu")" is executed, IM00077" is extracted, and image data corresponding to this identifier is extracted from an image file through the multimedia information registration table so as to be displayed in the conversion candidate menu. FIG. 13 shows the relation between the word dictionary, multimedia information registration table and the image data file. The key word registered in the multimedia information registration table is also registered as the reading as the first element of the word dictionary.

At this time, the registration ID of the multimedia information registration table is registered in an associated fashion as the second element of the word dictionary.

The multimedia information registration table is configured for enabling various modification operations, such as addition, deletion or correction of registration data, such that, if various modification operations in the multimedia information registration table, such as addition, deletion or correction of registration image identifiers or keywords in the multimedia information registration table are performed, such operations are reflected in the corresponding registration data in the word dictionary so that similar modifications are made in the word dictionary.

As a exemplary sentence dictionary for inputting in Japanese, used in the document editing processing apparatus according to the present invention, such a one shown in FIG. 12 may be envisaged. The exemplary sentence dictionary of the type shown in FIG. 12 is of a list structure comprised of first elements representing a character string defined as the retrieving condition, shown centrally, reading of the candidate words, as second elements, on the left side, and candidate words and candidate images, as third elements, shown on the right side.

If, in the exemplary sentence dictionary of FIG. 12, the character string as the second element, shown centrally in the drawing, is matched to the character string directly previous to the input position, and the retrieving condition (reading) of the first element, shown on the left, is specified, the character string as the third element, shown on the right side, is selected as a candidate word. If the third element, shown on the right side, is an image identifier ID, the image data having this image ID is to be selected.

FIG. 13 shows the relation among the exemplary sentence dictionary, multimedia information registration table and the image data file. It is noted that key words registered in the multimedia information registration table are also registered as the reading of the second element in the exemplary sentence dictionary. At this time, the registration IDs of the multimedia information registration table are registered as they are associated as the third element in the exemplary sentence dictionary. The candidate words and the candidate images, selected via the exemplary sentence dictionary and the multimedia information registration table, are displayed in the conversion candidate menu. If, in the example shown at the bottom row of FIG. 12, an input character string かわいい(cute)" is defined, a retrieval processing of extracting data having かわいい(cute)" in the exemplary sentence dictionary is carried out, whereby an image IM00012", that is "image data of a dog" is invoked from the image data file and displayed in the conversion candidate menu. If, after the input character string かわいい(cute)" is defined, the reading い(uttered as "i")" or いぬ(dog, uttered as "inu")" is input as the reading, an image having an image identifier "IM00012", that is the "image of a dog" is selected as a candidate image and displayed on the conversion candidate menu.

As in the case of the word dictionary, as mentioned above, a variety of modification operations, such as addition, deletion or correction of registration image identifiers or keywords in the multimedia information registration table are reflected in the corresponding registration data in the exemplary sentence dictionary so that similar modifications are made in the exemplary sentence dictionary.

If, in retrieving the word dictionary and the exemplary sentence dictionary, there is a defined character string, the exemplary sentence dictionary is retrieved in preference to the word dictionary. If there is no defined character string, the word dictionary is retrieved. Moreover, the data registration sequence is changed dynamically. That is, if certain registered data is displayed as conversion candidate in the conversion candidate menu and the selection operation by the user is performed, a registration sequence interchanging processing is executed to array the registered data at the leading end in each dictionary. The dictionary retrieving processing is sequentially executed beginning from the leading end of each dictionary until the number of displayed candidates in the conversion candidate menu is equal to N. The extracted words or images are displayed as conversion candidate menu. If no object of conversion is found in the menu, the next candidate display command is input and dictionary retrieval is further prosecuted to display new N candidate data as menu. If candidate words and candidate images are retrieved in this manner depending on the retrieving conditions, matching operations are sequentially executed beginning from the leading end of the dictionary shown in FIGS. 11 and 12.

The dictionaries shown in FIGS. 11 and 12 are arranged so that words and exemplary sentences selected at the time of document formulation are added at the leading ends, the words and exemplary sentences added to the leading ends are displayed preferentially as candidate words and candidate images at the time of the next retrieval, so that, when the words or images used frequently are input a second time, these are likely to be displayed initially in the menu as conversion candidates.

In the retrieval processing of the candidate words and candidate images in the document inputting technique in the document editing processing apparatus of the present invention, almost all candidate words and candidate images, required in document inputting, may be selected by merely specifying the reading of one or two characters.

By employing predicted candidate retrieval of estimating candidate words of the highest possibility of occurrence from the character string already defined as mentioned above with reference to FIG. 7, the frequency of occurrence of candidate words required is further increased, thus improving the possibility of inputting words without it being necessary to specify the reading as the retrieving conditions.

Moreover, in the present embodiment, different dictionaries may also be used depending on the sort or the context of the document to be prepared to enable more effective document inputting. For example, if a list of place names, having place names as a dictionary, is used as a dictionary, address inputting in preparing a list database is facilitated, whereas, if a exemplary sentence dictionary, having a collection of exemplary sentences as candidate words, is used, exemplary sentences used in writing a letter etc can be retrieved easily. Meanwhile, if, in the case of a dictionary of place name lists, the list is formed in a hierarchical structure in the sequence of a prefecture, sub-prefecture, city, town, village and address, the place names as candidate words can be retrieved and specified easily.

The description of the above-described embodiment is centered about the processing of still image data. However, with the document editing processing apparatus of the present invention, not only the still image data, but also a variety of other multimedia information pieces, such as moving picture information, audio information or other programs may be invoked based on data input. By registering moving picture information access data for accessing the moving picture information in association with keywords in a registration table shown in FIGS. 3 and 13, the moving picture information can be invoked based on the keywords. Similarly, by registering speech information access data for accessing the speech information and program access data for accessing variable programs in association with keywords in a registration table shown in FIGS. 3 and 13, the speech information and variable programs can be invoked based on the keywords.

In the above explanation of inputting in Japanese or in English, so-called ambiguity retrieval is not performed. If there are only few or no candidate words beginning from the reading specified as the retrieving condition, it is also possible to perform ambiguity retrieval. For example, if, in case of inputting in Japanese, a reading てけ(uttered as "teke")", the ambiguity retrieval employing て(uttered as "te")" and け(uttered as "ke")" is performed, because there are hardly any words beginning from てけ(uttered as "teke")". By this ambiguity retrieval, it is possible to display words such as 電総研(uttered as "densouken")". On the other hand, if a reading ぱだ(uttered as "pada")", the ambiguity retrieval employing ぱ(uttered as "pa")" and だ(uttered as "da")" is performed, because there are hardly any words beginning from ぱだ(uttered as "pada")". By this ambiguity retrieval, it is possible to display candidate words "パンダ(giant panda, uttered as "panda" or "パウダー(powder, uttered as "pauda")" or candidate images such as "image data of a giant panda". In the case of inputting in English, a word such as "Pithecanthropus" may be input merely by specifying "p", "t", "p" and "s".

Taking the case of the inputting in English, the retrieving processing of candidate words by the above-described ambiguity retrieval is explained.

Figure 14:
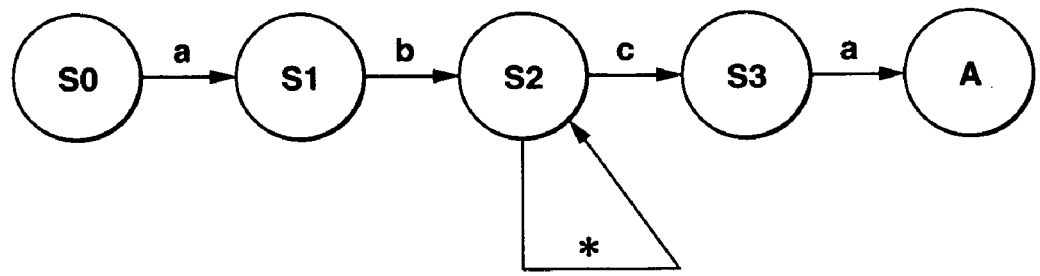
FIG. 14 shows a basic structure of a status transition mechanism of the ambiguity retrieval as applied in the document editing processing apparatus according to the present invention.

In the document inputting preparation processing in the document editing processing apparatus of the present invention, two sorts of normal expression recognition algorithms are used in combination in the word dictionary in order to execute ambiguity retrieval speedily. For example, in retrieving the character string "ab ca", the status transition mechanism for recognizing the character string pattern "ab ca" may be represented as shown in FIG. 14, where "*" denotes any optional character string. In the status transition mechanism, shown in FIG. 14, an initial state S0 transfers to the next state S1 by an input character "a", the state S1 transfers to the state S2 by an input character "b", the status S2 transfers to the state S3 by an input character "c" without transition by the input character * and the state S3 transfers to the state A by an input character "a". The status A is termed an ultimate state or a received state and indicates whether or not the input character string "ab ca" has been received. If the input characters "a", "b", c or a are not afforded, the states S0 to S3 and A are caused to disappear.

Figure 15:
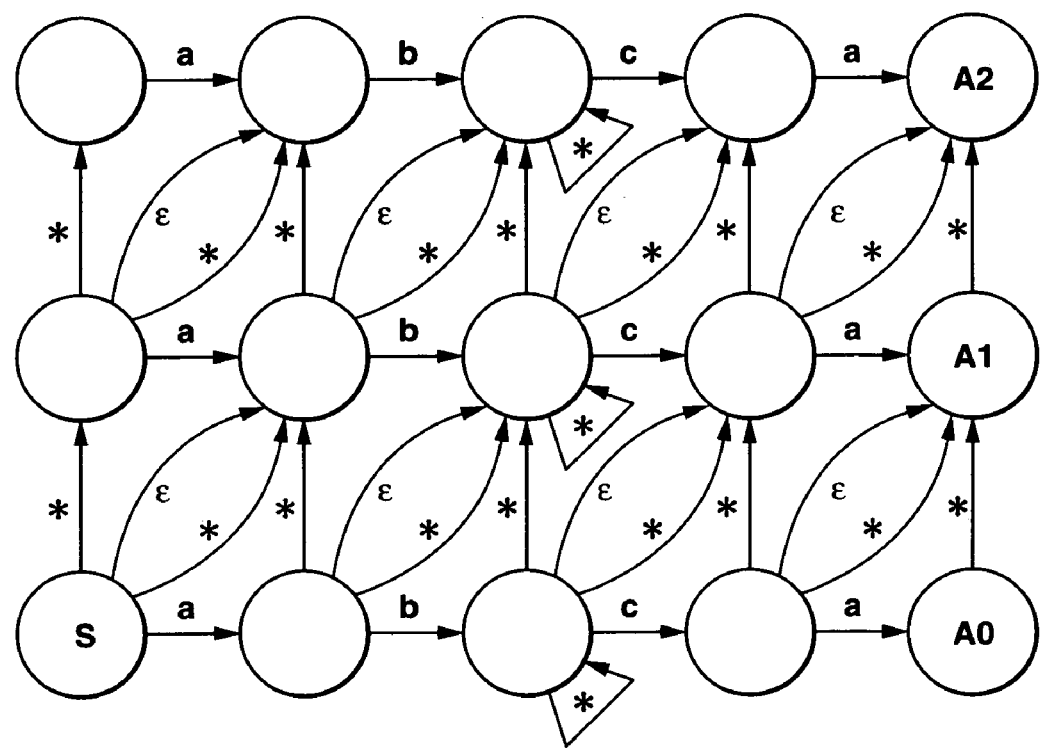
FIG. 15 illustrates a structure extended from the status transition mechanism of the ambiguity retrieval used in the document editing processing apparatus according to the present invention.

The status transition mechanism, represented as in FIG. 14, may be extended to a mechanism allowing for mismatch, such as incorrect or dropped characters or mistaken insertion, by increasing the number of states as shown in FIG. 15. Specifically, the state A0 in FIG. 15 is a reception state not allowing for mismatch, whereas the states A1 and A2 are reception states allowing for character errors and character errors, respectively.

In the above-described technique for ambiguity retrieval, the technique for effecting pattern matching using e.g., shift operations is discussed in Ricardo A. Baeza-Yates and Gaston H. Gonnet, A New Approach to Text Searching, Communication of the ACM, Vol.35, No.10, pp. 74–82, October 1992 or in Sun Wu and Udi Manber, Agrep A First Approximate Pattern Matching Tool, In Proceedings of USENIX Technical Conference pp. 153–162, San Francisco, Calif., January 1992. On the other hand, realization in hardware is also discussed in H Yamada, K. Takahashi, M. Hirata and H. Nagai, Retrieval of Character String Allowing for Ambiguity Retrieval, Nikkei Electronics, No.422, pp. 165–181, Jan. 6, 1987. The present inventors have also extended a thesis in the journal of the Association of Information Processing, January 1996, pp. 13 to 23. So, detailed discussion are omitted herein. It is noted that, in the ambiguity retrieval, it is also possible to input several optional characters in a character string in the order in which they appear in the character string, instead of inputting the leading character of the character string, to effect retrieval of candidate words.

Figure 16:
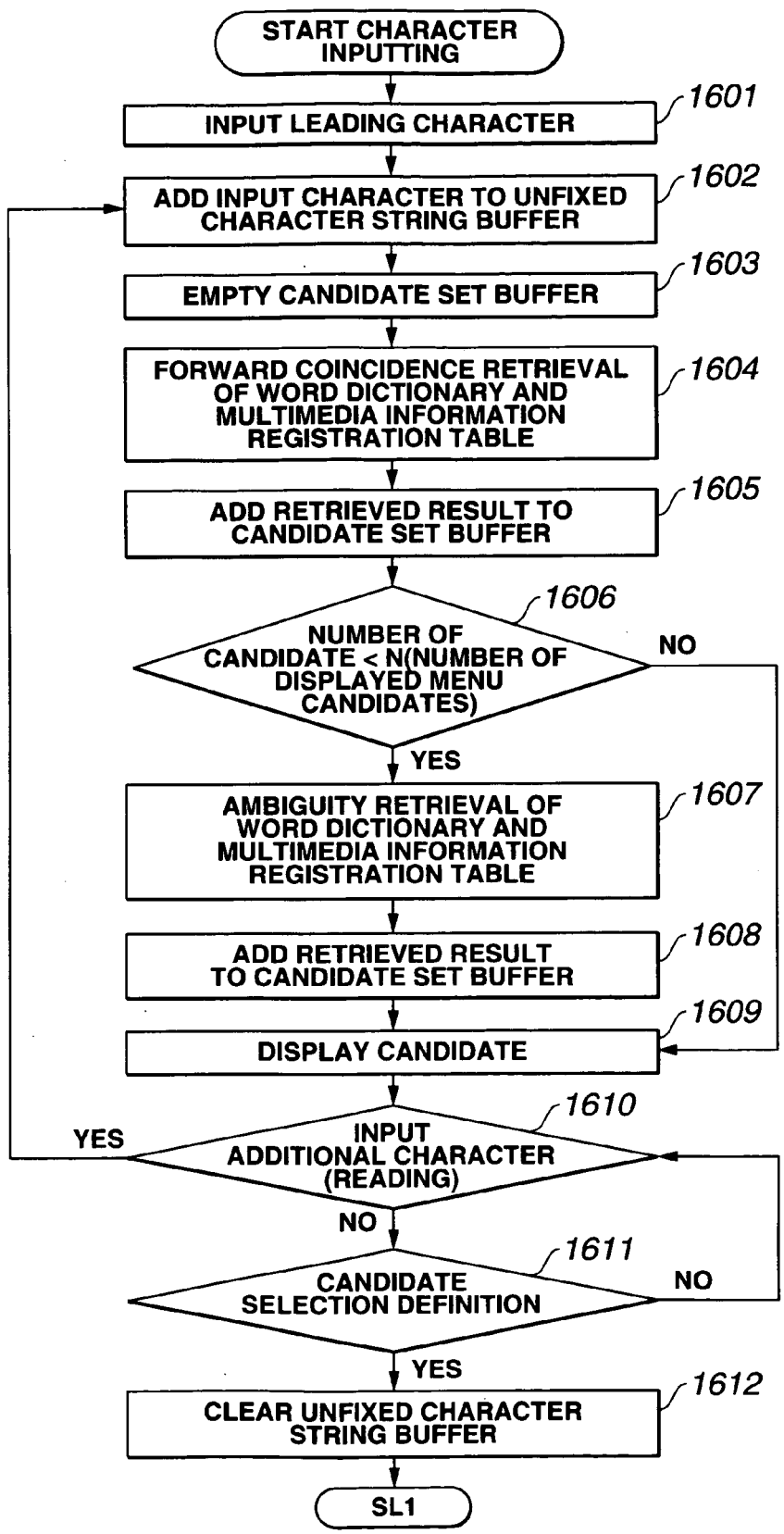
FIG. 16 shows a flowchart showing the processing for preparing the hybrid text-picture document in the document editing processing apparatus according to the present invention.
Figure 17:
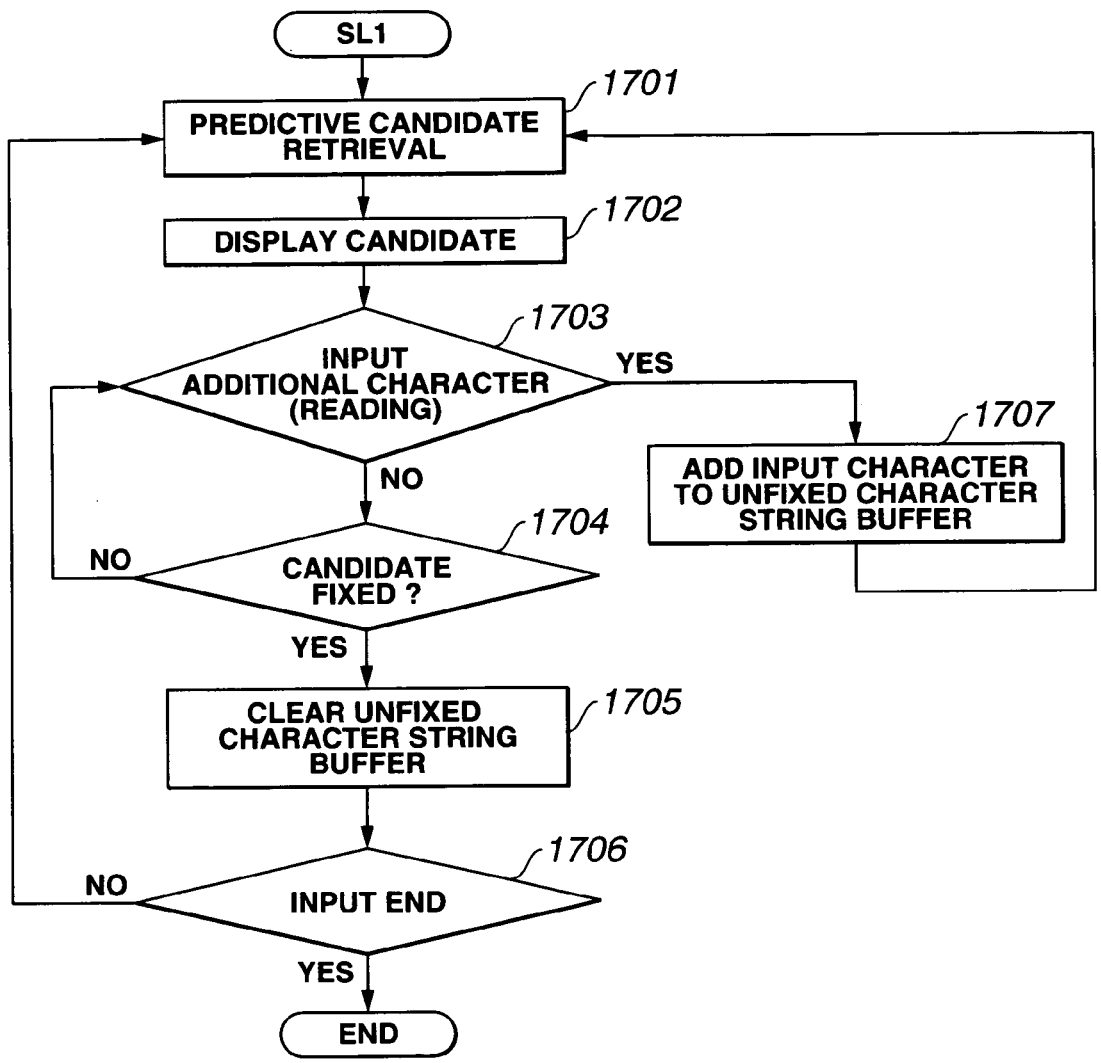
FIG. 17, continuing to FIG. 16, shows a flowchart showing the processing for preparing the hybrid text-picture document in the document editing processing apparatus according to the present invention.

The processing flow for the realization of the above-described specified document inputting in the configuration of FIG. 1 is now explained with reference to FIG. 16 ff. The processing shown in the flowchart is implemented by a CPU 101 controlling various components and performing data processing based on a document inputting program stored in a hard disc or in a ROM. The document inputting program is designed for the CPU 101 to execute the processing shown in the flowchart. Meanwhile, FIGS. 16 and 17 show the entire input processing in the document editing processing apparatus 100 configured as shown in FIG. 1. These FIGS. 16 and 17 are shown separately for convenience in the drawing, although these should inherently be drawn on the same drawing sheet.

First, at step 1601 in FIG. 16, the reading of a leading character of a character string desired to be input is input as the retrieving condition. That is, from the keys of the respective characters on a keyboard, the reading of the leading character for specifying the retrieving condition is input, as mentioned above.

When the reading of the leading character has been input, the CPU 101 causes data of the input character to be stored at step 1602 in an undefined character string buffer provided in a RAM 103 of FIG. 1, while clearing at step 1603 a buffer for storage of a set of candidate words and candidate images provided in the RAM 103. This buffer is termed herein a candidate set buffer. Meanwhile, the undefined character string buffer is a buffer for storing character strings specified as the retrieving conditions. The retrieving conditions are constituted not only by sole characters but also by character strings made up of two or more character strings and remain undefined until selection of the candidate words. So, in the present embodiment, the buffer for storing the character strings specified as the retrieving conditions is termed the undefined character string buffer.

At the next step 1604, the CPU 101 retrieves from the word dictionary (see FIG. 11) and the multimedia information registration table (see FIG. 3) the multimedia information pieces, such as candidate words having a character or character string stored in the undefined character string buffer as the first character or as the first character string, or associated image data by the leading character or character string of the keyword being the character of the character string stored in the undefined character string buffer. The retrieval which has the leading character or the character string as the keyword is termed forward coincidence retrieval. The CPU 101 causes the multimedia information pieces, such as the candidate words and candidate images obtained by the forward coincidence retrieval at step 1604, to be stored at step 1605 in the candidate set buffer.

The CPU 101 at step 1606 verifies whether or not the number of the retrieved multimedia information pieces, such as the candidate words and candidate images, is smaller than the pre-set number N of the displayed candidate menu. This N is in agreement with the number of the pieces that can be displayed on the picture display. If the result of check is NO, that is if it is verified at step 1606 that the number of the retrieved multimedia information pieces, such as the candidate words and candidate images, is not less than N, the CPU 101 proceeds to the processing of step 1609 as later explained. If the result of check is YES, that is if it is verified that the number of the retrieved multimedia information pieces, such as the candidate words and candidate images, is less than N, the CPU 101 proceeds to the processing of step 1607.

At step 1607, since the number of the retrieved candidate words is as yet smaller than the number N of the displayed candidates in the conversion candidate menu, retrieval is further made for candidate words from the word dictionary and the multimedia information registration table. Meanwhile, the number of the multimedia information pieces, such as the candidate words and candidate images, by the ambiguity retrieval, can be adjusted so that the number plus the number of the previously retrieved multimedia information pieces, such as the candidate words and candidate images. After the ambiguity retrieval at step 1607, the CPU 101 at step 1608 adds the so-obtained set of the retrieved results (set of the candidate words) to the candidate set buffer. The CPU 101 at step 1609 reads out the set of the multimedia information pieces, such as the candidate words and candidate images, stored in the candidate set buffer, to display a menu on the display device 120.

The CPU 101 at step 1610 also verifies whether or not an additional character is input, that is whether or not the reading of a character added as the retrieving condition has been input. If the result of check is YES, that is if the additional character has been input at this step 1601, the program reverts to step 1602 to add the character to the characters or to the character string previously stored in the undefined character string buffer to store the resulting characters or character string in the undefined character string buffer. The processing as from step 1603 to step 1610 then is carried out using the character string stored in the undefined character string buffer as a new retrieving condition. The same applies for a case in which an additional character is to be input at step 1610.

If it is verified at step 1610 that there is no additional input character, the CPU 101 at step 1611 verifies whether or not the selection of the multimedia information pieces, such as candidate words and candidate images, has come to a close, that is whether or not the selection of the multimedia information pieces, such as candidate words and candidate images, from the conversion candidate menu demonstrated on the display device 120, has been made. If the result of check at this step 1611 is NO, that is if the candidate words and candidate images have not been defined at step 1611, the program reverts to step 1610. If the result of check at this step 1611 is YES, that is if the candidate words and candidate images have not been defined, the processing transfers to step 1612.

When one of the multimedia information pieces, such as candidate words and candidate images, has been defined as being a constituent element of the document being prepared, the CPU 101 at step 1612 clears the undefined character string buffer to proceed then to the processing of step 1701 ff., in FIG. 17. Since the data input as at least one document constituent element is already defined by the processing of the flowchart of FIG. 16, predictive candidate retrieval is performed in the processing at step 1701 of FIG. 17 for predicting the multimedia information pieces, such as candidate words and candidate images, that should come next to the defined word, for example, the candidate words and candidate images having the maximum possibility of occurrence as described above. If the set of the multimedia information pieces, such as candidate words and candidate images, is obtained by the predictive candidate retrieval as described above, the CPU 101 at step 1702 causes the set of the multimedia information pieces, such as candidate words and candidate images, as a conversion candidate menu, on the display device 120.

The CPU 10 then verifies, at step 1703, whether or not an additional character is input, that is whether or not a character added as the retrieving condition from input means, such as a keyboard, has newly been input.

If the result of check at this step S1 is YES, that is if the additional character has been input at step 1703, the newly added character is added to the character or character string stored in the undefined character string buffer, for being stored therein. The processing as from step 1701 up to step 1703 is then performed in the same manner as above, using the character string stored in the undefined character string buffer as the new retrieving condition. The same applies for a case wherein an additional character is further input at step 1703.

If it is verified at step 1703 that an additional character has not been input, the CPU 101 verifies at step 1704 whether or not the candidate words have been defined, that is whether or not the candidate words and candidate images have been selected from the conversion candidate menu demonstrated on the display device 120. If the candidate words have not been defined at this step 1704, that is if the result of check is NO, the program reverts to step 1703. If the candidate words have been defined, that is if the result of check is YES, the processing transfers to step 1705.

If the undefined character string buffer is cleared at this step 1705, the CPU 101 proceeds to step 1706. At this step 1706, the CPU 101 verifies whether or not the inputting of a complete sentence has come to a close. If the result of decision at this step 1706 is NO, that is if it is found at step 1706 that the inputting has not come to a close, the program reverts to step 1701 ff., to repeat the processing as from step 1701 up to step 1706 until it is determined at step 1706 that the inputting has come to a close. If the result of decision at this step 1706 is YES, that is if it is found at step 1706 that the inputting has come to a close, the character inputting operation is terminated.

Figure 18:
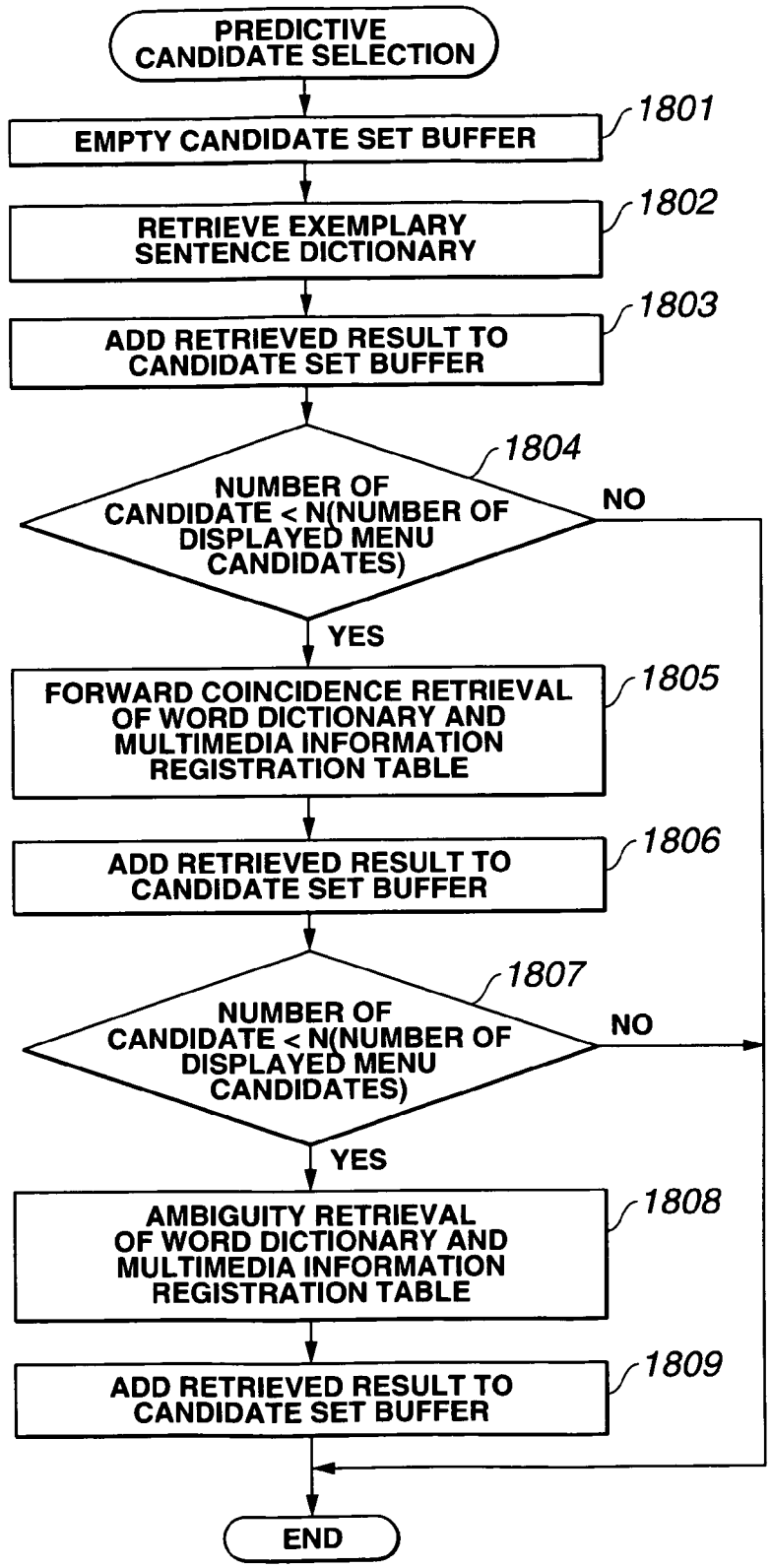
FIG. 18 is a flowchart showing the predictive candidate retrieving processing in the document editing processing apparatus according to the present invention.

The retrieval processing flow at step 1701 of the flowchart of FIG. 17 is now explained by referring to the flowchart of FIG. 18.

Referring to FIG. 18, the CPU 101 first clears the candidate set buffer at step 1801 to then retrieve at step 1802 the exemplary sentence dictionary (see FIG. 12). The CPU 101 after retrieving the exemplary sentence dictionary causes the multimedia information pieces, such as candidate words and candidate images, obtained on retrieval, to be stored in the candidate set buffer. If the multimedia information pieces, such as candidate words and candidate images, obtained on retrieval, are already stored in the candidate set buffer, the first stated information pieces are added to the candidate set buffer.

At this time, the CPU 101 at step 1804 verifies whether or not the number of retrieved candidate words is less than the pre-set number N of the candidates. If, in the decision at step 1804, the number of retrieved candidate words is not less than the pre-set number N of the candidates, the processing of the predictive candidate retrieval is terminated. If it is determined that the number of retrieved candidate words is less than the pre-set number N of the candidates, the processing transfers to step 1805.

At step 1805, the CPU 101 performs forward coincidence retrieval as to the keyword of the multimedia information registration table and the word dictionary. At the next step 1806, the CPU 101 causes the multimedia information pieces, such as candidate words and candidate images, obtained on retrieval, to be stored in the candidate set buffer.

The CPU 101 again checks whether or not the number of the multimedia information pieces, such as candidate words and candidate images, retrieved at step 1807, is smaller than N. If, in the decision at step 1807, the number of the multimedia information pieces, such as candidate words and candidate images is not less than N, the predictive candidate retrieval processing is terminated. If conversely the number of the multimedia information pieces, such as candidate words and candidate images is verified to be less than N, the processing transfers to step 1808.

When at step 1808, the CPU 101 performs ambiguity retrieval on the keyword of the multimedia information registration table and the word dictionary. At the next step 1809, the CPU 101 causes the candidate words and candidate images, obtained on ambiguity retrieval, to be stored in the candidate set buffer to terminate the predictive candidate retrieval processing.

Embodiment 2

A second embodiment of the document editing processing method and apparatus according to the present invention are hereinafter explained.

In the configuration of the embodiment 1, the processing of specifying and demonstrating an image based on identifiers, such as images, registered in the word dictionary or in the exemplary sentence dictionary, explained with reference to FIGS. 11 and 12, is executed. The present embodiment is directed to a configuration in which multimedia data, such as image data, can be built into a document to be prepared, without interposition of a word dictionary or the exemplary sentence dictionary having registered therein image identifiers shown in FIGS. 11 and 12.

Figure 19:
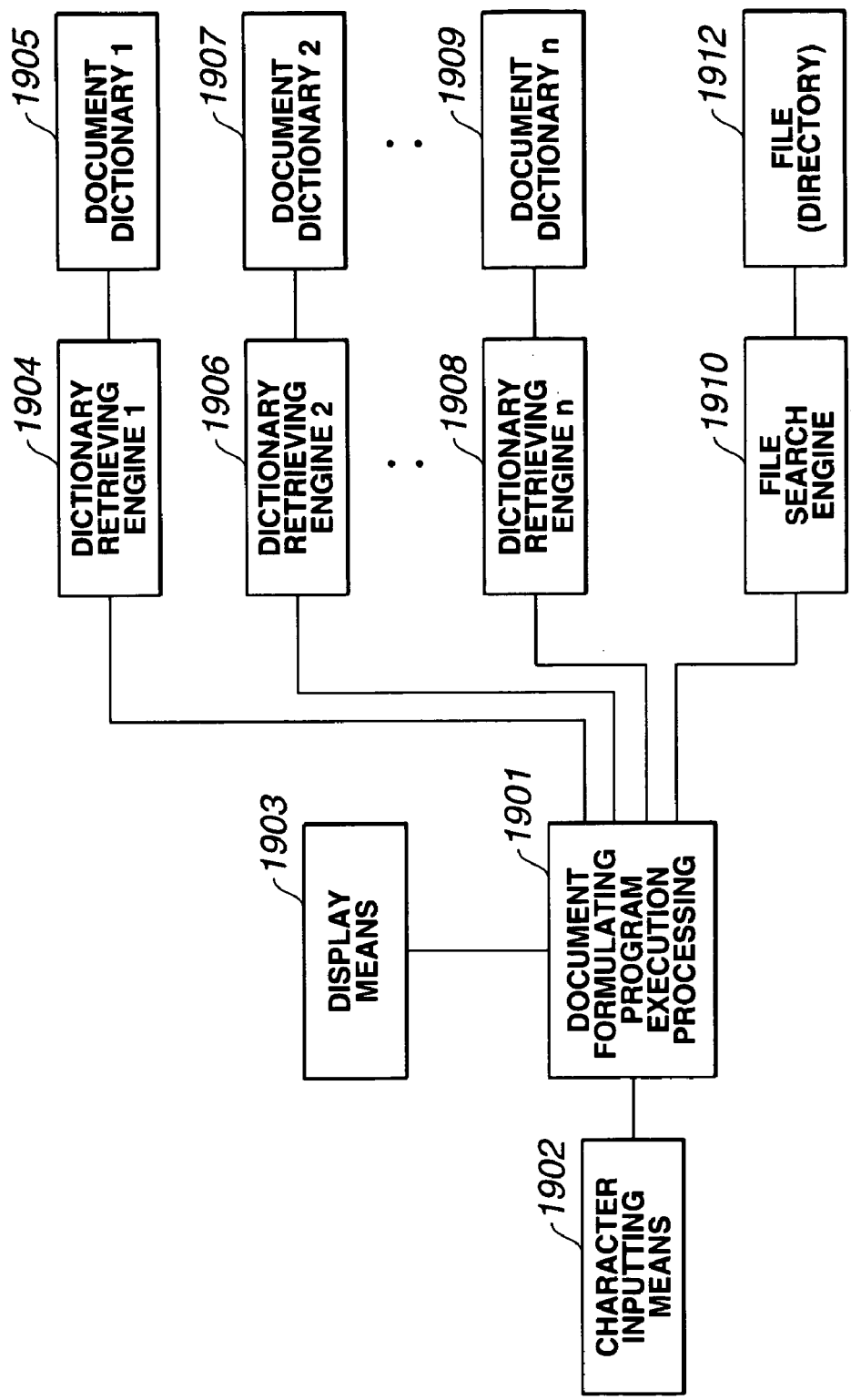
FIG. 19 is a block diagram showing the structure of a second embodiment of the document editing processing apparatus according to the present invention.

FIG. 19 shows a block diagram showing the basic structure of a document editing processing apparatus of the second embodiment. A document formulating program execution unit 1901 demonstrates an input character string on display means 1903, constituted by a CRT or an LCD, responsive to a character input from a user from a character inputting means 1902 made up e.g., of a keyboard, based on the application software program pertinent to document editing processing, while booting dictionary retrieving engines 1904, 1906, 1908 and a file search engine 1910, based on an input character string from the character inputting means 1902, to extract character strings, such as kanji characters, as conversion candidates, from a document dictionary, and to extract multimedia data, such as image data, from the file, for demonstration on a display means 1903.

FIG. 19 shows plural document dictionaries 1905, 1907, 1909 as document dictionaries. However, such dictionary as is shown in FIG. 20 may be among these dictionaries. Although the word dictionary of the type shown in FIG. 20 is similar to the word dictionary explained in connection with the embodiment 1, the first stated word dictionary does not include identifiers for multimedia data, such as images. The word dictionary shown in FIG. 20 has a list structure comprised of the reading (reading data corresponding to the candidate words) as the first element, and candidate words to be displayed, as the second element, shown on the left and right sides, respectively.

Among the exemplary sentence dictionaries for inputting in Japanese, used in the document editing processing apparatus of the present embodiment, there is such a one of the type shown in FIG. 21. The exemplary sentence dictionary of the type shown in FIG. 21, analogous to the exemplary sentence dictionary explained in the embodiment 1, is not provided with identifiers of the multimedia data, such as images. It is of a list structure including reading as the first element (reading data corresponding to candidate words), and candidate words to be displayed, as the second element, on the lest and right sides of FIG. 21.

The exemplary sentence dictionary for inputting in Japanese, used in the document editing processing apparatus of the present embodiment, may be configured as shown in FIG. 21. The exemplary sentence dictionary of the type shown in FIG. 21, analogous to the exemplary sentence dictionary explained in the embodiment 1, is not provided with identifiers of the multimedia data, such as images. It is of a list structure including first elements representing a character string defined as the retrieving condition, reading of candidate words as second elements and the candidate words as third elements, on the center, left and right sides of FIG. 21, respectively.

The above-described structure is similar to the dictionary structure, explained in connection with the above-described first embodiment. It is executed by a dictionary retrieval engine with which are associated the forward coincidence retrieval and ambiguity retrieval similar to those explained in the embodiment 1 and the extracted selected candidates and is displayed as the conversion candidate menu similar to that of the embodiment 1.

The configuration shown in FIG. 19 includes plural document dictionaries and dictionary retrieval engines associated with respective document dictionaries. These can be constituted as pre-existing kana-kanji conversion dictionaries, retrieval engines therefor, dictionaries for economics, user dictionaries generated by the user executing word registration, and associated retrieving engines. Although FIG. 19 shows respective dictionary retrieval engines associated with individual dictionaries, plural different document dictionaries can be constituted in association with a sole dictionary retrieval engine if different document dictionaries can be retrieved by a common retrieval processing algorithm.

A file search engine 1910 is a search engine executing the search of a file (directory) 1912. The file 1912 is registered in a directory of a hierarchical structure along with the filename, attributes, date of preparation and size. The file search engine 1910 retrieves a file contained in a recording medium being searched based on the filename. The file includes variable multimedia data, such as image data, figures, picture information, speech information and moving picture information.

Each file is provided with a filename and an extension such as "inu, bmp" in the case of bit map image data of a dog, in association with a file. Therefore, the file can be identified by a filename and an extension. In character inputting means 1902, the file search engine 1910 executes search of a filename contained in an object being searched based on a character string input by a user. In the filename search, forward coincidence retrieval processing is performed as in the case of the document dictionary and in the exemplary sentence dictionary explained previously with reference to FIGS. 20 and 21.

The file to be retrieved is a local recording medium in a system executing e.g., a document editing processing, such as a hard disc, a memory card, a floppy disc or a CD-ROM. Alternatively, an external storage device, such as a file server accessible over the network, can also be retrieved. A field to be retrieved by the file search engine 1910 can be optionally changed by the file connected in circuit. So, if there is a database having numerous specified image files in the file server over the network and the system executing the document editing processing can access the file server over the network, the file server is set as a field to be retrieved, such that it is possible to extract a file from the file server to display the extracted file data through the document formulating program execution unit 1901 in the conversion candidate menu of the display means 1903.

Figure 22:
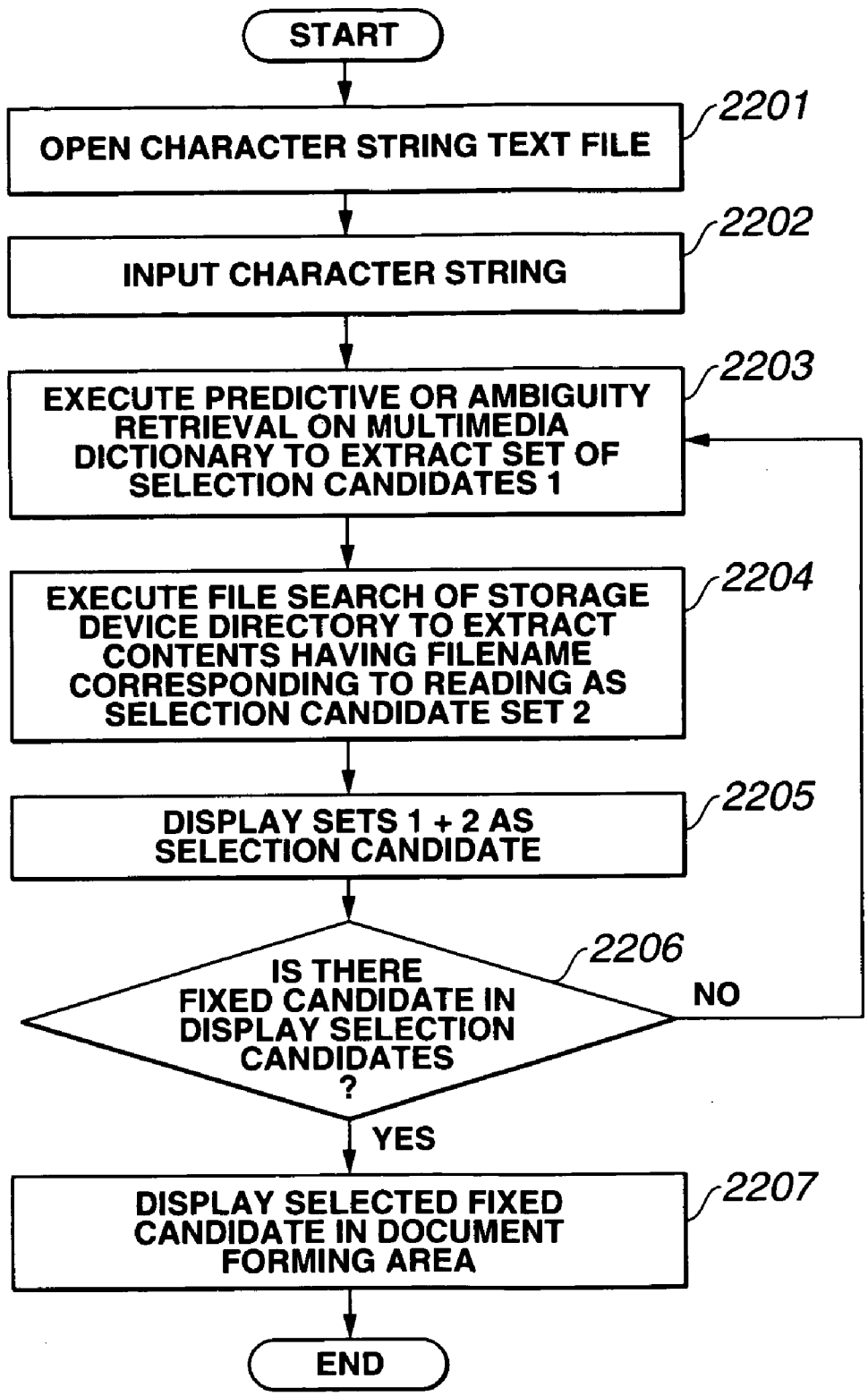
FIG. 22 is a flowchart showing the processing for preparing a hybrid multimedia document in the document editing processing apparatus according to the present invention.

FIG. 22 shows the processing flow of the preferred embodiment. The respective steps of the processing flow of FIG. 22 are hereinafter explained. At step 2201, a character string input text file, included in a document formulating program, is opened. By opening the character string input text file, included in the document formulating program, a picture which permits character inputting similar to that shown in FIGS. 4 to 10, explained in the embodiment 1, is demonstrated on the display means 1903 to permit the user to input a character string from the character inputting means 1902 at step 2202.

When the character inputting by the user is started, the document formulating program execution unit 1901 receives input characters from the character inputting means 1902 and boots the dictionary retrieval engine shown in FIG. 19 to make retrieval based on input characters of each document dictionary. The dictionary retrieval is performed here based on the retrieving algorithm set in association with respective dictionaries. The dictionaries of FIGS. 20 and 21 are included in the document dictionaries so that forward coincidence retrieval and ambiguity retrieval are executed. The technique for dictionary retrieval is similar to that described in connection with the embodiment 1. The conversion candidates, extracted in this manner, are extracted as a set of selected candidates (step 2203).

At step 2204, the file 1912 is retrieved by the file search engine 1910. This retrieves the filename, based on the input character string, to extract coincident filenames, by way of performing the aforementioned forward coincidence retrieval. The file to be retrieved is the file database, to which is connected a file search engine, and is a recording medium, such as a local hard disc or a file server connected to the network. In retrieving at step 2204, multimedia contents, such as image data, are extracted as a set of selected candidates 2.

Although the steps 2203 and 2204 are stated in FIG. 22 as steps executed by serial processing, these steps may also be executed by way of parallel processing.

The set of the selected candidates, extracted at steps 2203 and 2204, are demonstrated on the conversion candidate menu of the display means 1903 (step 2205). The display embodiment is similar to that shown in FIGS. 4 to 10 in connection with the embodiment 1. The number of the conversion candidates displayed is the pre-set number N, as explained in the embodiment 1, so that N conversion candidates are displayed in the menu.

If it is verified at step 2206 that there is a candidate desired by the user in the conversion candidate menu, the candidate to be defined is selected from the conversion candidate menu at step 2207 to display the defined candidate in a document formulation area.

If it is verified at step 2206 that there is no candidate desired by the user in the conversion candidate menu, the program reverts to step 2203 to continue the retrieving processing for the document dictionary and the file dictionary to extract the next candidate from the document dictionary and the file to demonstrate not more than N next candidates in the display means. The above processing is repeated to permit the user formulating the document to select desired conversion candidates from the conversion candidate menu to formulate a document including multimedia data, such as image data.

For registering multimedia data, such as new image data, it is only sufficient to register new files along with extensions, such that there is no necessity of performing any special operations, such as dictionary registration. The configuration of the preferred embodiment is such that the document formulating program execution unit 1901 boots the file search engine 1910 to retrieve the registered files. Therefore, if, for example, a new file is read-in by a scanner, and the pronunciation" is accorded as the filename to register the new image with the filename as a file of the file search engine to be searched, the file is automatically included in the object being searched by the file search engine.

The preferred embodiment differs from the embodiment 1 in that multimedia data such as image data is retrieved directly by file search without the interposition of a document dictionary, so that there is no necessity of providing special dictionaries for extracting multimedia data.

Embodiment 3

As an embodiment 3 of the document editing processing method and apparatus according to the present invention, an embodiment in which a hybridized multimedia data containing document is prepared using a multimedia dictionary having multimedia data registered therein is hereinafter explained.

Figure 23:
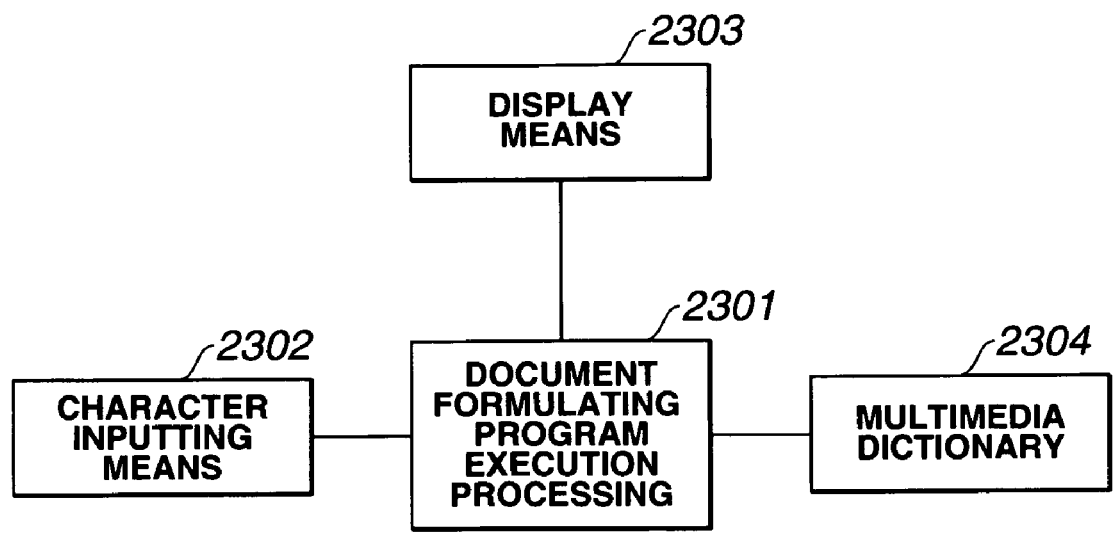
FIG. 23 is a block diagram showing the structure of a third embodiment of the document editing processing apparatus according to the present invention.

FIG. 23 shows a block diagram illustrating a basic structure of a document editing processing apparatus of the preferred embodiment. Based on the program of an application software pertinent to document editing processing, a document formulating program execution unit 2301 is responsive to a character inputting by a user from character inputting means 2302, such as a keyboard, to demonstrate an input character string in the display means 2303, such as CRT or LCD, to execute retrieval of a multimedia dictionary based on an input character string from the character inputting means 2302, to extract multimedia data, such as a character string of e.g., kanji (Chinese characters) or multimedia data, such as image data, operating as conversion candidates, from the multimedia dictionary 2304, for demonstration on the display means 2303. Meanwhile, the dictionary retrieving processing function is assumed to be included in the document formulating program execution unit 2301 in FIG. 23, such that the dictionary retrieval engine is not shown therein as an independent block.

Figure 24:
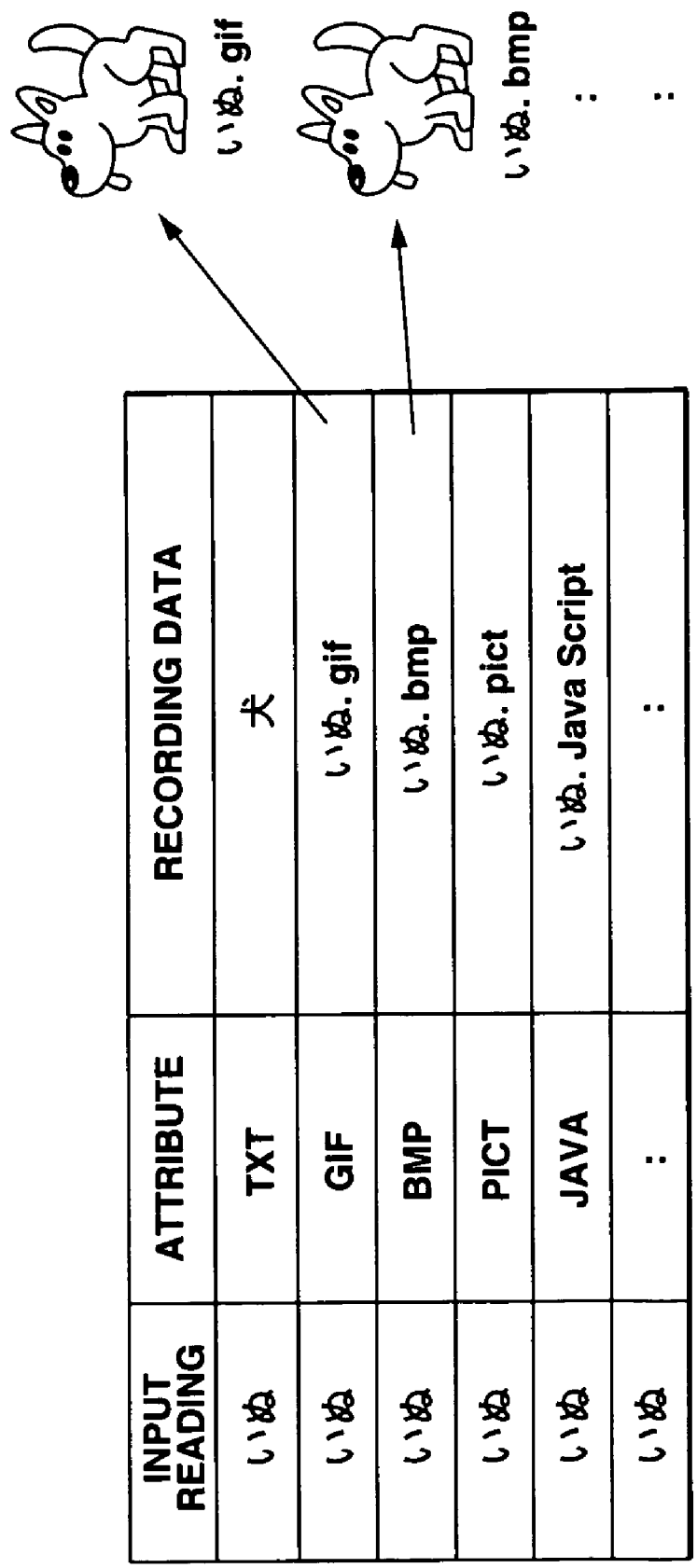
FIG. 24 shows an example of a multimedia dictionary used in the third embodiment of the document editing processing apparatus according to the present invention.

FIG. 24 shows an example of a multimedia dictionary 2304 employed in the instant embodiment. As shown in FIG. 24, the multimedia dictionary has "input reading", "attribute" and "recording data" as fields.

The "input reading" field is used as a retrieving field which is based on a character string input from the character inputting means 2302. The "attribute" field indicates the sort of the recording data such as sorts of data exemplified by TXT or GATE INSULATING FILM. In accordance with the program associated with these sorts, text, image or moving picture demonstration is realized. In the "recording data" field, a variety of multimedia data, such as real text data, image data or JAVA script programs, are stored.

The document formulating program execution unit 2301, shown in FIG. 23, is responsive to a character inputting by the user from the character inputting means 2302, such as a keyboard, to execute forward coincidence retrieval of the "input reading" field of the multimedia dictionary shown in FIG. 24 to extract corresponding data as selection candidate to display the extracted data as conversion candidate data in the conversion candidate menu (FIGS. 4 to 10) in the display means 2303 in accordance with the program associated with each attribute.

Figure 25:
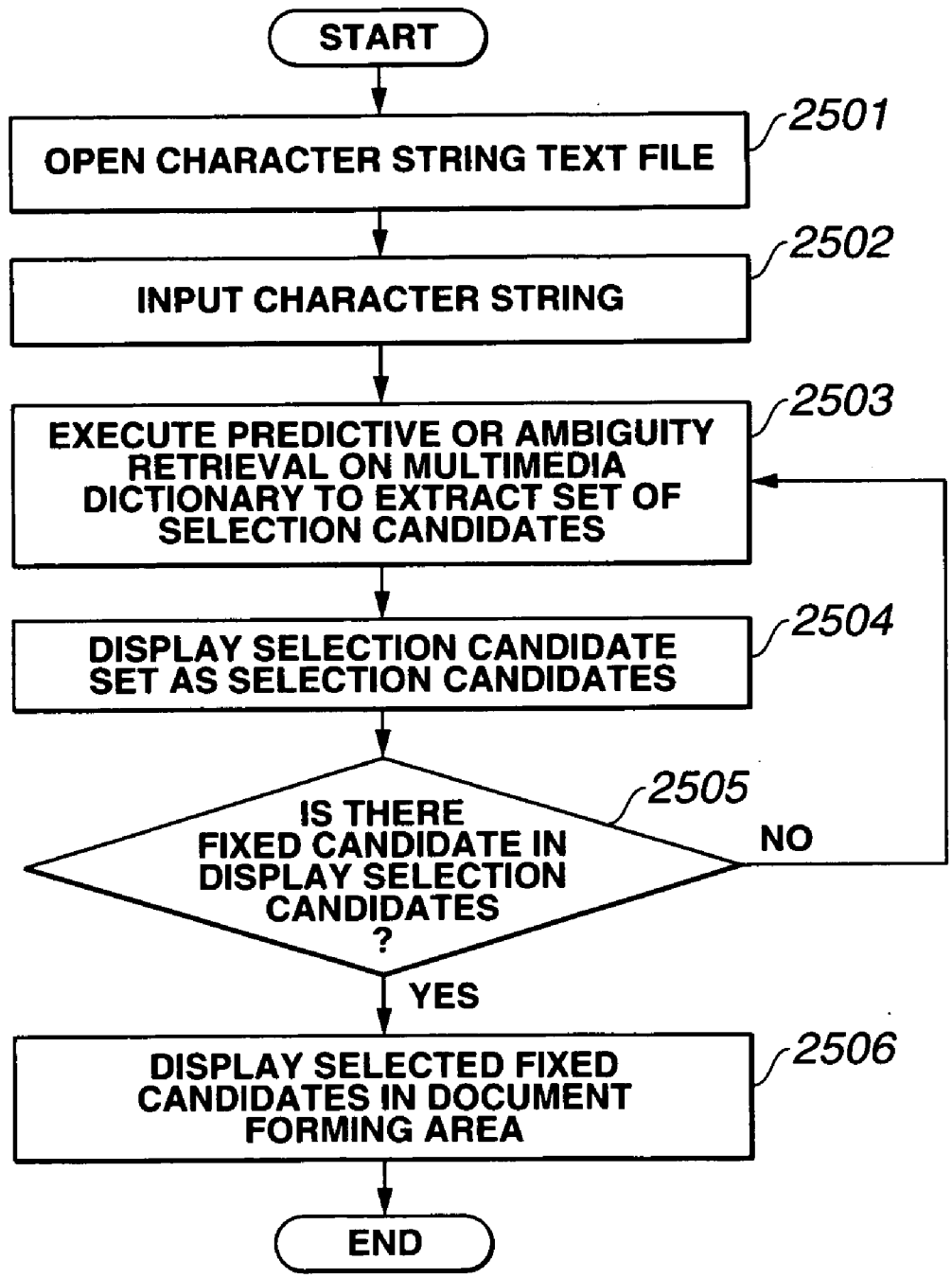
FIG. 25 is a flowchart showing the processing for preparing a hybrid multimedia document in the third embodiment of the document editing processing apparatus according to the present invention.

FIG. 25 shows the processing flow of the instant embodiment. The respective steps of the processing flow of FIG. 22 are hereinafter explained. At step 2501, a character string input text file, included in a document formulating program, is opened. By opening the character string input text file, included in the document formulating program, a picture which permits character inputting similar to that shown in FIGS. 4 to 10, as explained in the embodiment 1, is demonstrated on the display means 2303 to permit the user to input a character string from the character inputting means 2302 at step 2502.

When the character inputting by the user is started, the document formulating program execution unit 2301 receives input characters from the character inputting means 2302 to make retrieval based on the input character to the "input reading" field of the multimedia dictionary. The dictionary retrieval, performed here, is based on forward coincidence retrieval, such that the retrieving condition is dynamically changed over responsive to the input character. The conversion candidate extracted as retrieved result is extracted as a set of selection candidates (step 2503).

The set of selection candidates, extracted at step 2503, is displayed in the conversion candidate menu of the display means 2303 (step 2504). The display mode is similar to the mode shown in FIGS. 4 to 10 in connection with the embodiment 1.

If it is found at step 2505 that there is a candidate desired by the user in the conversion candidate menu, a candidate to be defined is selected from the conversion candidate menu at step 2506 to display the defined candidate in the document forming area.

If it is verified at step 2505 that there is no candidate desired by the user in the conversion candidate menu, the program reverts to step 2503 to continue the processing for retrieving the multimedia dictionary to extract the next candidate to display the next candidate in the display means. This processing is performed repeatedly. By executing these processing operations, the user formulating the document selects desired conversion candidates from the conversion candidate menu to prepare a document including multimedia data, such as image data.

The multimedia data, such as new image data, is registered in a multimedia dictionary along with the "pronunciation" and "attribute".

Figure 26:
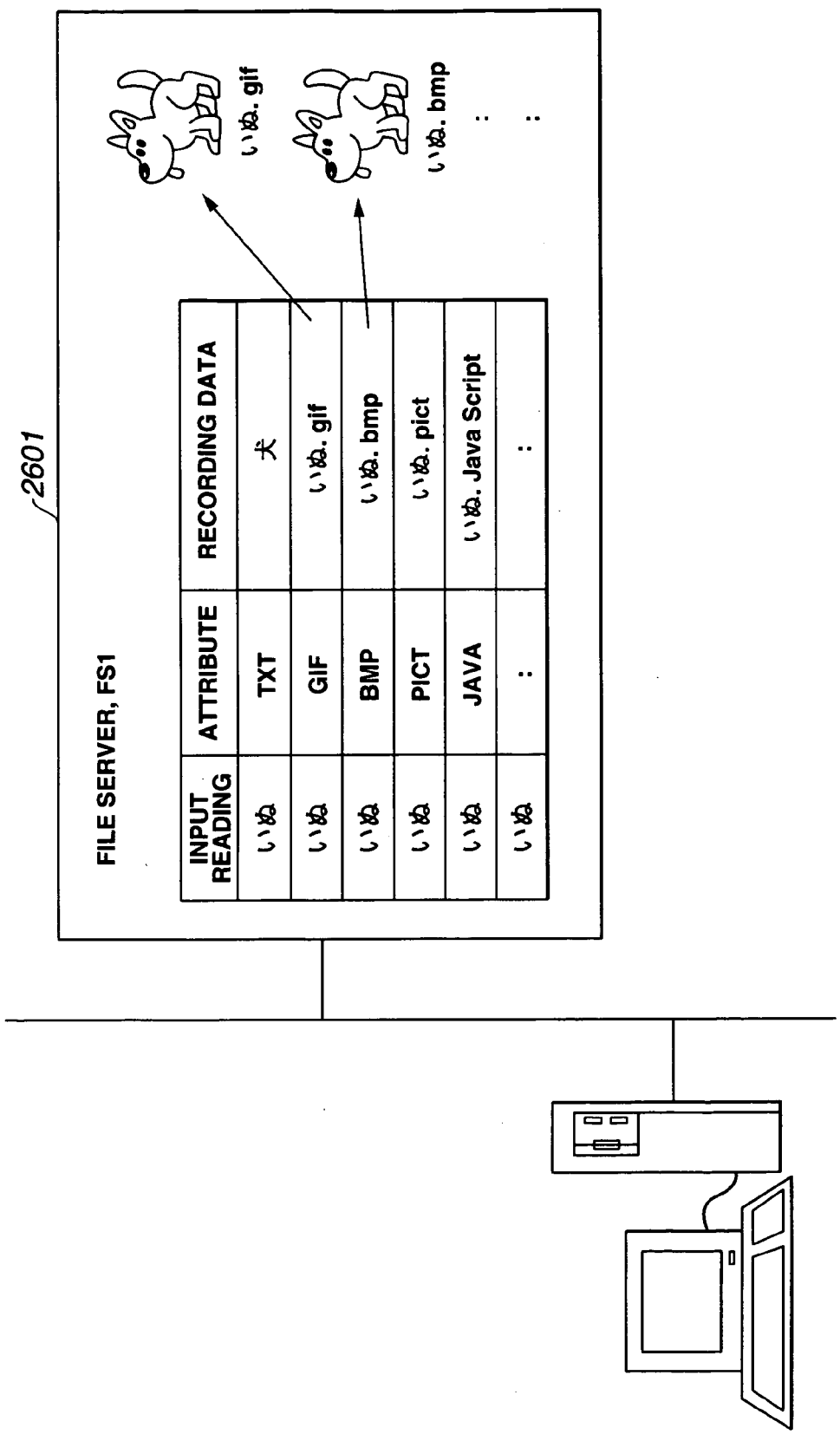
FIG. 26 shows an example in which a multimedia dictionary used in the third embodiment of the present invention is arranged in a file server accessible over a network.

Meanwhile, the multimedia dictionary may be stored in a local memory, such as hard disc, in a system executing document formulating processing, in readiness for retrieval. Alternatively, the multimedia dictionary may also be stored in a file server over a network, as shown for example in FIG. 26, and file servers FS1, 2601 shown in FIG. 26 may be set as a dictionary to be retrieved to extract multimedia data over the network.

Embodiment 4

As an embodiment 4 of the document editing processing method and apparatus according to the present invention, an embodiment is now explained in which multimedia data or data addresses are recorded on a multimedia dictionary, having multimedia data registered therein, to extract the address of a database over the network through a multimedia dictionary to make the multimedia data selectable by the extracted address.

Figure 27:
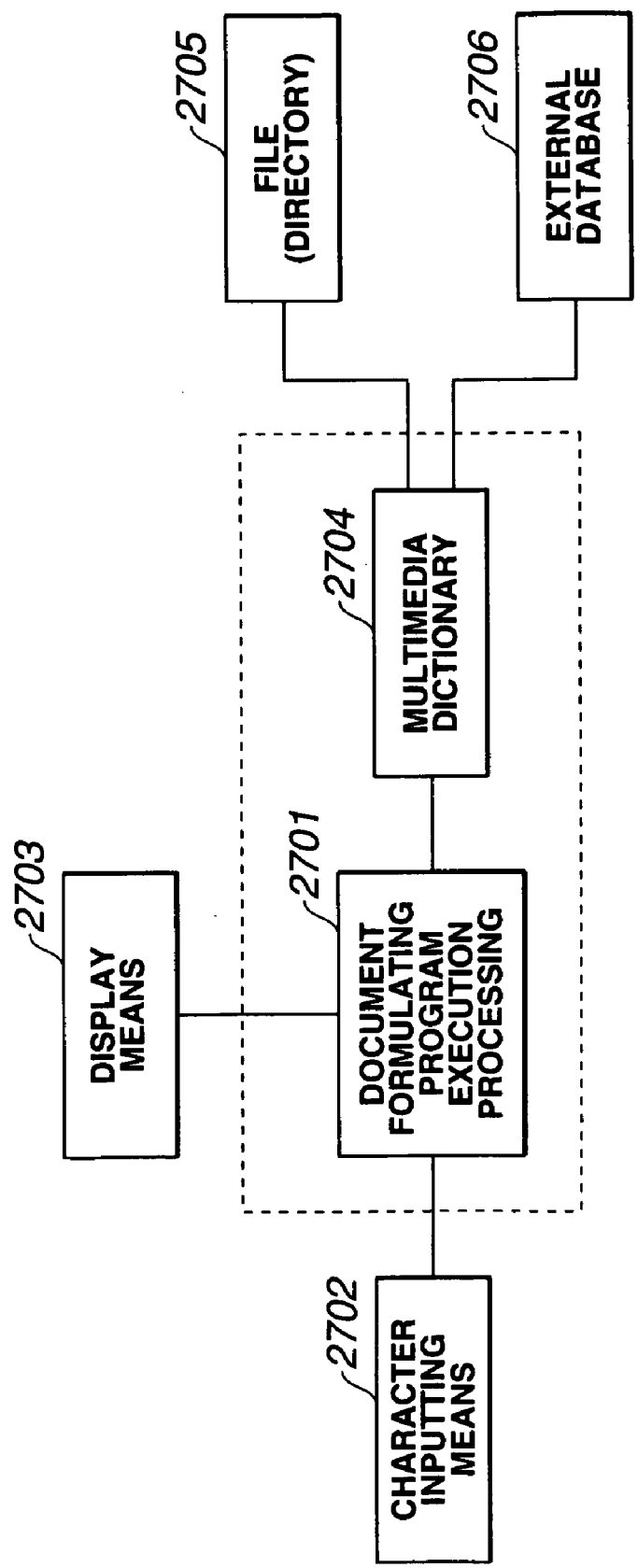
FIG. 27 is a block diagram showing the structure of a fourth embodiment of the document editing processing apparatus according to the present invention.

FIG. 27 shows a block diagram illustrating the basic structure of the document editing processing apparatus of the present embodiment. A document formulating program execution unit 2701 is responsive to a character inputting by a user from a character inputting means 2702, such as a keyboard, based on the program of an application software pertinent to document editing processing, to display an input character string on a display means 2703 constituted by, for example, a CRT or an LCD to retrieve a multimedia dictionary 2704 based on an input character string from the character inputting means 2702 and to extract multimedia data such as a character string of kanji characters or multimedia data, as conversion candidate, from the multimedia dictionary 2704, for display on the display means 2703. In the present embodiment, data addresses are stated in the multimedia dictionary 2704 and a file (directory) 2705 as well as an external database 2706 is retrieved responsive to the data address to extract multimedia data.

Figure 28:
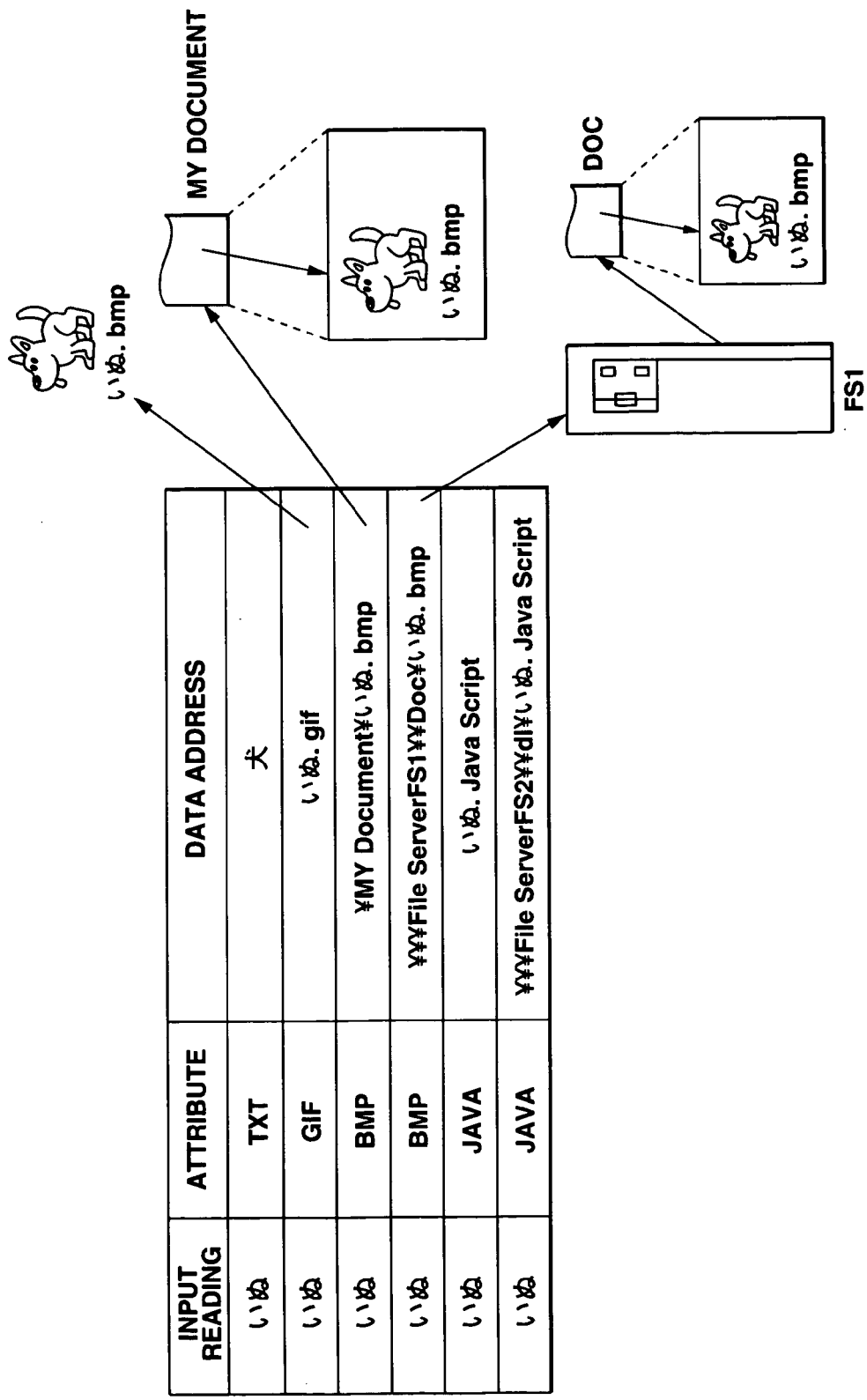
FIG. 28 shows an example of a multimedia dictionary used in the fourth embodiment of the document editing processing apparatus according to the present invention.

FIG. 28 shows an example of a multimedia dictionary used in the present embodiment. As shown in FIG. 28, the multimedia dictionary includes an "input reading", "attribute", and "recording data or data address" as fields.

The "input reading" field is used as a retrieving field which is based on a character string input by the user from the character inputting means 2702. The "attribute" field indicates the sort of the recording data, such as TXT, CIF or the like data sorts. Text display, image display and moving picture display are carried out in accordance with the program matched to these data sorts. In the "recording data or data address" field, variable multimedia data, such as real text data, image data or JAVA script programs, are stored, or addresses used for storing the multimedia data are recorded. If real data exist in the multimedia dictionary, the data is extracted and demonstrated on the display means 2703. If real data are not present in the multimedia dictionary and an address is stored therein, data specified by the address is acquired from the file (directory) 2705 or the external database 2706 for demonstration on the display means.

The document formulating program execution unit 2701, shown in FIG. 27, is responsive to a character input by a user from the character inputting means 2702, such as a keyboard, to execute forward coincidence retrieval of the "input reading" field of the multimedia dictionary shown in FIG. 28 to extract corresponding data as a selection candidate to display the extracted data as conversion candidate data in the conversion candidate menu of the display means 2703 (see FIGS. 4 to 10) in accordance with the program consistent with variable attributes. In the present embodiment, if real data is recorded in the multimedia dictionary, the data is extracted and demonstrated on the display means 2702. However, if no real data are recorded in the dictionary, by the address is recorded, data specified by the address is acquired from the file (directory) 2705 or the external database 2706 for demonstration on the display means.

For registering the multimedia data, such as new image data, new data is registered along with "pronunciation" or "attribute" in the multimedia dictionary, or the "address" of new data is recorded along with the "pronunciation" or "attribute".

Although specified embodiments of the present invention have been explained in the foregoing, it is apparent that the present invention can be corrected or substituted by those skilled in the art without departing from the scope of the invention. That is, the present invention has been disclosed merely for illustration and should not be interpreted in a limiting fashion. Although the foregoing description has been centered about the mode of executing the document processing in a personal computer in the above-described embodiments, the document editing processing apparatus of the present invention can be applied not only to the inputting from a keyboard to an inputting device having a portable display such that not only the inputting from a keyboard but also a variety of data inputting systems such as the command input by a pen or a handwriting character inputting system can be applied as reading inputting system.

Although the foregoing description has been centered about processing for preparing a hybridized text-still image document, the document editing processing apparatus of the present invention is able to invoke not only the still image but also a variety of other multimedia information pieces, such as moving picture information, speech information or other programs, based on the data input. For example, by configuring a registration table of the embodiment 1 shown in FIGS. 1, 3 and 13 by the moving picture access data for accessing the moving picture information and the associated keyword, the speech information and the variable program information items can be invoked based on the keyword. In the embodiments 2 to 4, variable multimedia information pieces can be registered in the accessible files or multimedia dictionaries to render it possible to prepare a document in which variable multimedia data are present in a hybridized form. The purport of the present invention can be best understood by referring to the claims.

What is claimed is:

1. A computer-implemented document editing processing apparatus for preparing a document by the inputting of a character string, comprising:

displaying means for displaying characters and images;

inputting means for inputting a character string in a document forming area in the display means;

storage means having stored therein the multimedia information at least including a figure, image information, speech information and the moving picture information;

a word dictionary in which reading data is associated with a displayed character and further the reading data is associated with a multimedia information identifier representing the multimedia information to be displayed;

a multimedia information registration table in which a keyword associated with reading data in the word dictionary is associated with the multimedia information identifier; and retrieving means for executing forward coincidence retrieval on reading data of said word dictionary, with an undefined character as a retrieving condition, from one new character inputting processing by said inputting means to another, wherein if the multimedia information identifier is included in data extracted from the word dictionary as a result of retrieval by said retrieving means, the multimedia information as determined based on said multimedia information identifier is extracted from said storage means for demonstration on said display means as selectable conversion candidate data.

2. The computer-implemented document editing processing apparatus according to claim 1 further comprising:

an exemplary sentence dictionary in which a defined character is associated with reading data of a character most likely to be input next to said defined character and with a display character associated with said reading data and in which reading data is associated with a multimedia information identifier indicating the multimedia information to be displayed;

said retrieving means executing retrieval of a defined registered character of said exemplary sentence dictionary or forward coincidence retrieval of said defined registered character with the registered reading data, using the defined character or the combination of said defined character with an undefined character as a retrieving condition; wherein if there is included a multimedia information identifier in data extracted from the exemplary sentence dictionary as a result of retrieval by said retrieving means, the multimedia information indicated by said multimedia information identifier is extracted from said storage means for demonstration as selectable conversion candidate data on said display means.

3. The computer-implemented document editing processing apparatus according to claim 1 wherein said multimedia information registration table includes multimedia information access data, in association with each multimedia information identifier, for accessing the multimedia information stored in said storage means;

said multimedia information access data including data for specifying storage means having the multimedia information stored therein.

4. The computer-implemented document editing processing apparatus according to claim 1 wherein said storage means having the multimedia information stored therein is storage means accessible over a network.

5. The computer-implemented document editing processing apparatus according to claim 1 wherein said multimedia information registration table is configured for being associated with one or more keywords in association with respective multimedia information identifiers.

6. The computer-implemented document editing processing apparatus according to claim 1 wherein
said multimedia information registration table is configured for making various modifications, such as addition, deletion or correction of registered data and wherein the various modifications, such as addition, deletion or correction of registered multimedia information identifiers or keywords in said multimedia information registration table are reflected in corresponding registered data of said word dictionary so that similar modifications are made in said word dictionary.

7. The computer-implemented document editing processing apparatus according to claim 2 wherein
said multimedia information registration table is configured for making various modifications, such as addition, deletion or correction of registered data and wherein the various modifications, such as addition, deletion or correction of registered multimedia information identifiers or keywords in said multimedia information registration table are reflected in corresponding registered data of said exemplary sentence dictionary so that similar modifications are made in said exemplary sentence dictionary.

8. The computer-implemented document editing processing apparatus according to claim 1 wherein
said conversion candidate data are represented in a document forming area of said display means or in the vicinity thereof as a set of plural conversion candidate data not exceeding N which is a pre-set display number, and wherein conversion candidate words or conversion candidate multimedia information selected from the displayed conversion candidate data are displayed as defined data in a document input position in the document forming area.

9. The computer-implemented document editing processing apparatus according to claim 1 wherein said word dictionary is configured for dynamically changing the registration sequence of registered data, said word dictionary being also configured so that, if data is selected as document component data in document forming processing, the relevant data in said word dictionary is moved to the leading end;
said retrieving means being configured for sequentially retrieving said word dictionary beginning from the leading end thereof.

10. The computer-implemented document editing processing apparatus according to claim 2 wherein said exemplary sentence dictionary is configured for dynamically changing the registration sequence of registered data, said word dictionary being also configured so that, if data is selected as document component data in document forming processing, the relevant data in said exemplary sentence dictionary is moved to the leading end; said retrieving means being configured for sequentially retrieving said exemplary sentence dictionary beginning from the leading end thereof.

11. A computer-implemented document editing processing apparatus for preparing a document by the inputting of a character string, comprising:
displaying means for displaying characters and images;
inputting means for inputting a character string in a document forming area in said display means;
storage means having stored therein the multimedia information at least including one of a figure, the image information, speech information and the moving picture information so that said multimedia information can be extracted depending on a filename;
a word dictionary in which reading data is associated with display characters;
dictionary retrieving means for executing forward coincidence retrieval on reading data of said document dictionary, using an undefined character as a retrieving condition, from one new character inputting processing by said inputting means to another;
file retrieving means for executing forward coincidence retrieval on filenames of said storage means, using an undefined character as a retrieving condition, from one new character inputting processing by said inputting means to another; wherein
data extracted from said document dictionary as a result of retrieval by said dictionary retrieving means and multimedia information extracted from said storage means as a result of retrieval by said file retrieving means are displayed on said displaying means as selectable conversion candidate data.

12. The computer-implemented document editing processing apparatus according to claim 11 wherein
retrieving processing of a document dictionary by said dictionary retrieving means and retrieving processing of a file of said storage means by said file retrieving means are executed in parallel.

13. The computer-implemented document editing processing apparatus according to claim 11 wherein said document dictionary is constituted by plural different document dictionaries, and wherein there are provided plural dictionary retrieving means for executing retrieval of said plural document dictionaries, the retrieving processing of document dictionaries by said plural dictionary retrieving means being executed in parallel.

14. The computer-implemented document editing processing apparatus according to claim 11 wherein said storage means having said multimedia information stored therein is storage means accessible over a network.

15. The computer-implemented document editing processing apparatus according to claim 11 wherein said conversion candidate data are represented by a set of a plurality of, specifically, not larger than N conversion candidate data, in a document forming areas of said display means or in the vicinity thereof, said N being a pre-set number of displayed data, conversion candidate words or the conversion candidate multimedia information as selected from the displayed conversion candidate data being demonstrated as defined data at document input positions in the document forming area.

16. A computer-implemented document editing processing apparatus for preparing a document by the inputting of a character string, comprising:
displaying means for displaying characters and images;
inputting means for inputting a character string in a document forming area in said display means;
a multimedia dictionary in which reading data is associated with displayed characters and in which the reading data is associated with the multimedia information containing at least one of the reading data, figure, image information, speech information and the moving picture information; and
retrieval means for executing forward coincidence retrieval on the reading data of said multimedia dictionary, with the undefined character as a retrieving condition, from one new character inputting processing from said inputting at means to another;

at least one of the displayed characters or the multimedia information extracted from said multimedia dictionary as a result of retrieval by said retrieval means being displayed as selectable conversion candidate data in said display means.

17. The computer-implemented document editing processing apparatus according to claim 16 wherein said multimedia dictionary having said multimedia information as recording data is stored in storage means accessible over a network.

18. The computer-implemented document editing processing apparatus according to claim 16 wherein said conversion candidate data are represented by a set of a plurality of, specifically, not larger than N conversion candidate data, in a document forming areas of said display means or in the vicinity thereof, said N being a pre-set number of displayed data, conversion candidate words or the conversion candidate multimedia information as selected from the displayed conversion candidate data being demonstrated as defined data at document input positions in the document forming area.

19. A computer-implemented document editing processing apparatus for preparing a document by the inputting of a character string, comprising:
   displaying means for displaying characters and images;
   inputting means for inputting a character string in a document forming area in said display means;
   a multimedia dictionary in which reading data is associated with displayed characters and in which the reading data is associated with the multimedia information containing at least one of the reading data, figure, image information, speech information and moving picture information, or address data having stored therein said multimedia information;
   storage means having stored therein the multimedia information containing at least one of the reading data, figure, image information, speech information and moving picture information so that said multimedia information can be extracted depending on addresses; and
   retrieval means for executing forward coincidence retrieval on the reading data of said multimedia dictionary, with the undefined character as a retrieving condition, from one new character inputting processing from said inputting at means to another;
   at least one of the displayed characters or the multimedia information extracted from said multimedia dictionary as a result of retrieval by said retrieval means and data extracted from said storage means based on the address data extracted from said multimedia dictionary being displayed as selectable conversion candidate data in said display means.

20. The computer-implemented document editing processing apparatus according to claim 19 wherein said storage means having the multimedia information is accessible over a network.

21. The computer-implemented document editing processing apparatus according to claim 19 wherein said conversion candidate data are represented by a set of a plurality of, specifically, not larger than N conversion candidate data, in a document forming area of said display means or in the vicinity thereof, said N being a pre-set number of displayed data, conversion candidate words or the conversion candidate multimedia information as selected from the displayed conversion candidate data being demonstrated as defined data at document input positions in the document forming area.

22. A document editing processing method in a computer-implemented document editing processing apparatus for preparing a document by the inputting of a character string including displaying means for displaying characters and images, inputting means for inputting a character string in a document forming area in said display means, and storage means having stored therein the multimedia information including at least one of a figure, image information, speech information and the moving picture information, said method comprising:
   a retrieving condition setting step of setting an undefined character as a retrieving condition from one new character inputting processing from inputting means to another;
   a retrieving step of executing forward coincidence retrieval on reading data of a word dictionary, based on the retrieving condition as set at said retrieving condition setting step, said word dictionary being such a one in which the reading data is associated with a multimedia information identifier indicating the multimedia information to be displayed;
   a multimedia information extracting step of extracting from said storage means the multimedia information determined based on said multimedia information identifier when said multimedia information identifier is included in data extracted from the word dictionary in said retrieval step; and
   a display step for displaying the multimedia information extracted at said multimedia information extracting step as selectable conversion candidate data on said display means.

23. The document editing processing method according to claim 22 comprising:
   a second retrieving condition setting step of setting a defined character or a combination of a defined character and an undefined character as a retrieving condition from one input character defining processing or one new character inputting operation from inputting means to another; and
   a second retrieval step of executing retrieval on registered defined characters of an exemplary sentence dictionary having defined characters associated with a multimedia information identifier indicating the multimedia information for display most likely to be input next to the defined character, or forward coincidence retrieval of the registered defined characters and registered reading data, based on the retrieving condition as set at said second retrieving condition setting step;
   said multimedia information extracting step extracting from said storage means the multimedia information as determined based on said multimedia information identifier if the multimedia information identifier is included in data extracted from said exemplary sentence dictionary in said second retrieval step.

24. The document editing processing method according to claim 22 wherein
   said multimedia information registration table has multimedia information access data for accessing the multimedia information stored in said storage means in association with each multimedia information identifier; and wherein
   said multimedia information extracting step extracts the corresponding multimedia information from said storage means based on the multimedia information access data associated with said multimedia information identifier.

25. The document editing processing method according to claim 22 wherein
said display step is a step of displaying a set of a plurality of, specifically, not larger than N conversion candidate data, in a document forming area of said display means or in the vicinity thereof, said N being a pre-set number of displayed data; and wherein
if a conversion candidate word or a conversion candidate multimedia information piece is selected from the conversion candidate data displayed at said display step, the conversion candidate word or multimedia information pieces so selected is displayed as defined data at a document inputting position in said document forming area.

26. The document editing processing method according to claim 22 further comprising:
a word dictionary registration sequence changing step of shifting relevant data in said word dictionary to a leading end if said data is selected as sentence constituent data in document preparation processing.

27. The document editing processing method according to claim 22 further comprising:
a exemplary sentence dictionary registration sequence changing step of shifting relevant data in said exemplary sentence dictionary to a leading end if said data is selected as sentence constituent data in document preparation processing.

28. A document editing processing method in a computer-implemented document editing processing apparatus for preparing a document by the inputting of a character string including displaying means for displaying characters and images, inputting means for inputting a character string in a document forming area in said display means, a word dictionary having reading data associated with characters to be displayed, and storage means having stored therein the multimedia information including at least one of a figure, image information, speech information and the moving picture information so that said multimedia information can be extracted responsive to a filename, said method comprising:
a retrieving condition setting step of setting an undefined character as a retrieving condition from one new character inputting processing from inputting means to another;
a dictionary retrieving step of executing forward coincidence retrieval on reading data of the document dictionary, with the undefined character as a retrieving condition, from one new character inputting processing from said inputting means to another;
a file retrieving step of executing forward coincidence retrieval on filenames of said storage means, with the undefined character as the retrieving condition, from one new character inputting processing from said inputting means to another; and
a displaying step of demonstrating the data extracted from said document dictionary as a result of said dictionary retrieving step and the multimedia information extracted from said storage means as a result of said file retrieving step.

29. The document editing processing method according to claim 28 wherein said dictionary retrieving step and the file retrieving step are performed as parallel processing.

30. The document editing processing method according to claim 28 wherein said document dictionary is made up of a plurality of different document dictionaries; and wherein said dictionary retrieving step is such a step in which retrieval of a plurality of document dictionaries is executed in parallel by a plurality of dictionary retrieving means.

31. The document editing processing method according to claim 28 wherein
said display step is a step of displaying a set of a plurality of, specifically, not larger than N conversion candidate data, in a document forming area of said display means or in the vicinity thereof, said N being a pre-set number of displayed data; and wherein
the method further includes a step of displaying a conversion candidate word or a conversion candidate multimedia information piece as defined data at a document inputting position in said document forming area if the conversion candidate word or multimedia information piece is selected from the conversion candidate data displayed at said display step.

32. A document editing processing method in a computer-implemented document editing processing apparatus including displaying means for displaying characters and images, inputting means for inputting a character string in a document forming area in said display means, and a multimedia dictionary having reading data associated with a displayed character and having the reading data associated with multimedia information containing at least one of a figure, image information, speech information and the displayed character, said method comprising:
a retrieving condition setting step of setting an undefined character as a retrieving condition from one new character inputting processing from inputting means to another;
a dictionary retrieving step of executing forward coincidence retrieval on reading data of the multimedia dictionary, with the undefined character as a retrieving condition, from one new character inputting processing from said inputting means to another; and
a displaying step of demonstrating the data extracted from said multimedia dictionary as a result of said dictionary retrieving step as selectable conversion candidate data on said display means.

33. The document editing processing method according to claim 32 wherein
said display step is a step of displaying a set of a plurality of, specifically, not larger than N conversion candidate data, in a document forming area of said display means or in the vicinity thereof, said N being a pre-set number of displayed data; and wherein
the method further includes a step of displaying a conversion candidate word or a conversion candidate multimedia information piece as defined data at a document inputting position in said document forming area if the conversion candidate word or multimedia information piece is selected from the conversion candidate data displayed at said display step.

34. A document editing processing method in a computer-implemented document editing processing apparatus including displaying means for displaying characters and images, inputting means for inputting a character string in a document forming area in said display means, a multimedia dictionary having reading data associated with a displayed character and having the reading data associated with multimedia information containing at least one of a figure, image information, speech information and the moving picture information, and storage means having stored therein the multimedia information containing at least one of a figure, image information, speech information and the moving picture information so that said multimedia information can be extracted responsive to an address, said method comprising:

a retrieving condition setting step of setting an undefined character as a retrieving condition from one new character inputting processing from inputting means to another;

a dictionary retrieving step of executing forward coincidence retrieval on reading data of the multimedia dictionary, with the undefined character as a retrieving condition, from one new character inputting processing from said inputting means to another; and a displaying step of demonstrating the display character or the multimedia information extracted from said multimedia dictionary as a result of said dictionary retrieving step or data extracted from said storage means based on address data extracted from said multimedia dictionary as selectable conversion candidate data on said display means.

35. The document editing processing method according to claim 34 wherein said display step is a step of displaying a set of a plurality of, specifically, not larger than N conversion candidate data, in a document forming area of said display means or in the vicinity thereof, said N being a pre-set number of displayed data; and wherein the method further includes a step of displaying a conversion candidate word or a conversion candidate multimedia information piece as defined data at a document inputting position in said document forming area if the conversion candidate word or multimedia information piece is selected from the conversion candidate data displayed at said display step.

36. A computer program for executing document editing processing on a computer system, said computer program including a retrieving condition setting step of setting an undefined character as a retrieving condition from one new character inputting processing from inputting means to another;

a retrieving step of executing forward coincidence retrieval on reading data of a word dictionary, based on the retrieving condition as set at said retrieving condition setting step, said word dictionary being such a one in which the reading data is associated with a multimedia information identifier indicating the multimedia information to be displayed;

a multimedia information extracting step of extracting from said storage means the multimedia information determined based on said multimedia information identifier when said multimedia information identifier is included in data extracted from the word dictionary in said retrieval step; and a display step for displaying the multimedia information extracted at said multimedia information extracting step as selectable conversion candidate data on said display means.

37. A computer program for executing document editing processing on a computer system, said computer program including a retrieving condition setting step of setting an undefined character as a retrieving condition from one new character inputting processing from inputting means to another;

a dictionary retrieving step of executing forward coincidence retrieval on reading data of the document dictionary, with the undefined character as a retrieving condition, from one new character inputting processing from said inputting means to another;

a file retrieving step of executing forward coincidence retrieval on filenames of said storage means, with the undefined character as the retrieving condition, from one new character inputting processing from said inputting means to another; and a displaying step of demonstrating the data extracted from said document dictionary as a result of said dictionary retrieving step and the multimedia information extracted from said storage means as a result of said file retrieving step.

* * * * *